(12) United States Patent
Kanada et al.

(10) Patent No.: US 10,841,658 B2
(45) Date of Patent: Nov. 17, 2020

(54) CONTENT PLAYBACK DEVICE, CONTENT PLAYBACK SYSTEM, AND CONTENT PLAYBACK METHOD

(71) Applicant: Yamaha Corporation, Shizuoka (JP)

(72) Inventors: Masafumi Kanada, Shizuoka (JP); Akihito Kashiwagi, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 0 days.

(21) Appl. No.: 15/854,082

(22) Filed: Dec. 26, 2017

(65) Prior Publication Data

US 2018/0124467 A1   May 3, 2018

Related U.S. Application Data

(63) Continuation-in-part of application No. PCT/JP2016/070000, filed on Jul. 6, 2016.

(30) Foreign Application Priority Data

Jul. 10, 2015 (JP) ................................ 2015-138989

(51) Int. Cl.
*G06F 3/0481* (2013.01)
*H04N 21/472* (2011.01)
(Continued)

(52) U.S. Cl.
CPC ... *H04N 21/47217* (2013.01); *G06F 3/04812* (2013.01); *H04L 29/06* (2013.01);
(Continued)

(58) Field of Classification Search
CPC ..... G06F 17/30; G06F 3/04812; H04L 29/06; G06Q 99/00; H04N 21/47217;
(Continued)

(56) References Cited

U.S. PATENT DOCUMENTS 8,099,511 B1 *   1/2012   Ganesan ............ H04N 21/2225
                                                         709/231
8,717,857 B2 *   5/2014   Spitzlinger ............. G06F 21/10
                                                         369/30.09
(Continued)

FOREIGN PATENT DOCUMENTS

JP        2006-252659 A      9/2006
JP        2007-122830 A      5/2007
(Continued)

OTHER PUBLICATIONS

Office Action in the corresponding Japanese Patent Application No. 2015-138989, dated Jul. 9, 2019.
(Continued)

*Primary Examiner* — Steven P Sax
(74) *Attorney, Agent, or Firm* — Global IP Counselors, LLP

(57) ABSTRACT

A content playback device includes a receiver, an electronic controller and a communication device. The receiver receives a first playback request indicating a first content from a first user terminal and a second playback request indicating a second content from a second user terminal. The electronic controller includes a registration unit that registers the first and second contents indicated by the received first and second playback requests in a reservation list. The communication device transmits the reservation list to the first user terminal. The electronic controller includes evaluation reception unit that receives a first evaluation with respect to at least one of the first and second contents from the first user terminal. The electronic controller includes determination unit that determines the playback order of the contents registered in the reservation list based on the first evaluation.

15 Claims, 19 Drawing Sheets

(51) Int. Cl.
*H04N 21/4363* (2011.01)
*H04L 29/06* (2006.01)
*H04N 21/41* (2011.01)
*H04N 21/482* (2011.01)
*H04N 21/432* (2011.01)

(52) U.S. Cl.
CPC ... *H04N 21/4126* (2013.01); *H04N 21/43637* (2013.01); *H04N 21/4825* (2013.01); *H04N 21/4325* (2013.01)

(58) Field of Classification Search
CPC .......... H04N 21/4825; H04N 21/4325; H04N 21/4126; H04N 21/43
See application file for complete search history.

(56) References Cited

U.S. PATENT DOCUMENTS

| | | | | |
|---|---|---|---|---|
| 9,712,586 B2* | 7/2017 | McIntosh | ............ | H04N 21/252 |
| 10,228,900 B2 | 3/2019 | Dion et al. | | |
| 2005/0097618 A1* | 5/2005 | Arling | ................ | H04L 12/2805 |
| | | | | 725/114 |
| 2005/0201254 A1* | 9/2005 | Looney | ................ | G10H 1/0041 |
| | | | | 369/124.01 |
| 2010/0115406 A1* | 5/2010 | Kim | ......................... | G06F 3/14 |
| | | | | 715/704 |
| 2010/0228740 A1* | 9/2010 | Cannistraro | ........... | G06Q 30/00 |
| | | | | 707/748 |
| 2010/0228803 A1* | 9/2010 | Quinn | ................. | G06F 16/4387 |
| | | | | 707/808 |
| 2010/0260259 A1* | 10/2010 | Kimmich | ............. | H04L 1/0003 |
| | | | | 375/240.07 |
| 2011/0060998 A1* | 3/2011 | Schwartz | ............. | G06F 16/954 |
| | | | | 715/738 |
| 2012/0114302 A1* | 5/2012 | Randall | ................ | G11B 27/105 |
| | | | | 386/241 |
| 2014/0317647 A1* | 10/2014 | Itakura | ................. | H04N 21/252 |
| | | | | 725/13 |
| 2015/0115837 A1* | 4/2015 | Ohta | ....................... | H05B 37/02 |
| | | | | 315/294 |
| 2015/0128039 A1* | 5/2015 | Wieder | ................. | G06F 3/0481 |
| | | | | 715/716 |
| 2015/0222680 A1* | 8/2015 | Grover | ................ | H04L 65/4084 |
| | | | | 709/204 |
| 2015/0288779 A1* | 10/2015 | Okumura | ................. | H04L 67/10 |
| | | | | 709/219 |
| 2015/0347577 A1* | 12/2015 | Miyazaki | ............. | H04N 21/436 |
| | | | | 707/752 |
| 2016/0261904 A1* | 9/2016 | Qian | ................. | H04N 21/41407 |

FOREIGN PATENT DOCUMENTS

| | | |
|---|---|---|
| JP | 2012-521036 A | 9/2012 |
| JP | 2014-071169 A | 4/2014 |
| JP | 2015114403 A | 6/2015 |
| JP | 2015115681 A | 6/2015 |
| WO | 2012117452 A1 | 9/2012 |

OTHER PUBLICATIONS

Translation of Office Action in the corresponding Japanese Patent Application No. 2015-138989, dated Feb. 13, 2020.
Translation of Office Action in the corresponding Japanese Patent Application No. 2015-138989, dated Sep. 17, 2020.

* cited by examiner

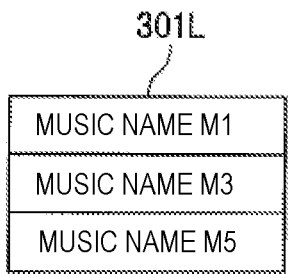
FIG. 5A
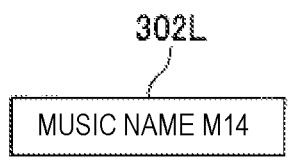
FIG. 5B
| TERMINAL NAME | MUSIC NAME |
|---|---|
| SMARTPHONE 301 | MUSIC NAME M1 |
| SMARTPHONE 301 | MUSIC NAME M3 |
| SMARTPHONE 301 | MUSIC NAME M5 |
| SMARTPHONE 303 | MUSIC NAME M12 |
| SMARTPHONE 302 | MUSIC NAME M14 |
FIG. 5C

CONTENT PLAYBACK DEVICE, CONTENT PLAYBACK SYSTEM, AND CONTENT PLAYBACK METHOD

CROSS-REFERENCE TO RELATED APPLICATIONS

This application is a continuation-in-part application of International Application No. PCT/JP2016/070000, filed Jul. 6, 2016, which claims priority to Japanese Patent Application No. 2015-138989 filed in Japan on Jul. 10, 2015. The entire disclosures of International Application No. PCT/JP2016/070000 and Japanese Patent Application No. 2015-138989 are hereby incorporated herein by reference.

BACKGROUND

Technological Field

The present invention relates to a content playback device, a content playback system, and a content playback method for determining the playback order of contents.

Background Technology

Various content playback systems have been proposed. For example, the content playback system of International Publication No. 2012/117452 (hereinafter referred to as Patent Document 1) allows sharing and listening of contents owned by the each of the users. The content playback system of Patent Document 1 comprises a plurality of source devices that store content data, and a sink device that plays back content data acquired from each of the source devices. The source device transmits a playback request to the sink device. The sink device registers a list in which the playback requests received from each source device are arranged in the order of reception as a reservation list. The sink device then plays back the contents in the order of the reservation list.

SUMMARY

However, in the content playback system of Patent Document 1, the contents are only played back in the order that the playback requests are received. Therefore, in the content playback system of Patent Document 1, it is not possible to change the playback order unless the user carries out an operation to delete the playback requests.

One example of an object of the presented in this disclosure is to provide a content playback device, a content playback system, and a content playback method for determining the playback order according to the desire of the user.

A content playback device according to one embodiment of the present disclosure comprises a receiver, an electronic controller and a communication device. The receiver is configured to receive a first playback request indicating a first content from a first user terminal, and a second playback request indicating a second content from a second user terminal. The electronic controller includes a registration unit that registers the first and second contents indicated by the received first and second playback requests in a reservation list. The communication device is configured to transmit the reservation list to the first user terminal. The electronic controller includes an evaluation reception unit that is configured to receive a first evaluation with respect to at least one of the first and second contents from the first user terminal. The electronic controller includes a determination unit that is configured to determine the playback order of the contents registered in the reservation list based on the first evaluation.

A content playback system according to another embodiment of the present disclosure comprises receiver, an electronic controller and a communication device. The receiver receives a first playback request indicating a first content from a first user terminal, and a second playback request indicating a second content from a second user terminal. The electronic controller includes registration unit that is configured to register the first and second contents indicated by the received first and second playback requests in a reservation list. The communication device is configured to transmit the reservation list to the first user terminal. The electronic controller includes an evaluation reception unit that is configured to receive a first evaluation with respect to at least one of the first and second contents from the first user terminal. The electronic controller includes a determination unit that is configured to determine the playback order of the contents registered in the reservation list based on the first evaluation. The electronic controller includes a playback unit that is configured to play back the contents registered in the reservation list.

A content playback method according to another embodiment of the present disclosure includes receiving in a content playback device a first playback request indicating a first content from a first user terminal; receiving in a content playback device a second playback request indicating a second content from a second user terminal; registering the first and second contents indicated by the first and second playback requests in a reservation list in the content playback device; transmitting the reservation list from the content playback device to the first user terminal; receiving in the content playback device a first evaluation with respect to at least one of the first and second contents from the first user terminal; and determining in the content playback device a playback order of the contents registered in the reservation list based on the first evaluation.

As explained in the present disclosure, it is possible to determine the playback order according to the desires of the users.

BRIEF DESCRIPTION OF THE DRAWINGS

FIG. 5A is a diagram illustrating an example of a public list in the first embodiment.

FIG. 5B is a diagram illustrating another example of a public list in the first embodiment.

FIG. 5C is a diagram illustrating an example of a shared list in an embodiment of the present invention.

DETAILED DESCRIPTION OF THE EMBODIMENTS

Selected embodiments will now be explained with reference to the drawings. It will be apparent to those skilled in the music field from this disclosure that the following descriptions of the embodiments are provided for illustration only and not for the purpose of limiting the invention as defined by the appended claims and their equivalents.

First Embodiment

Figure 1:
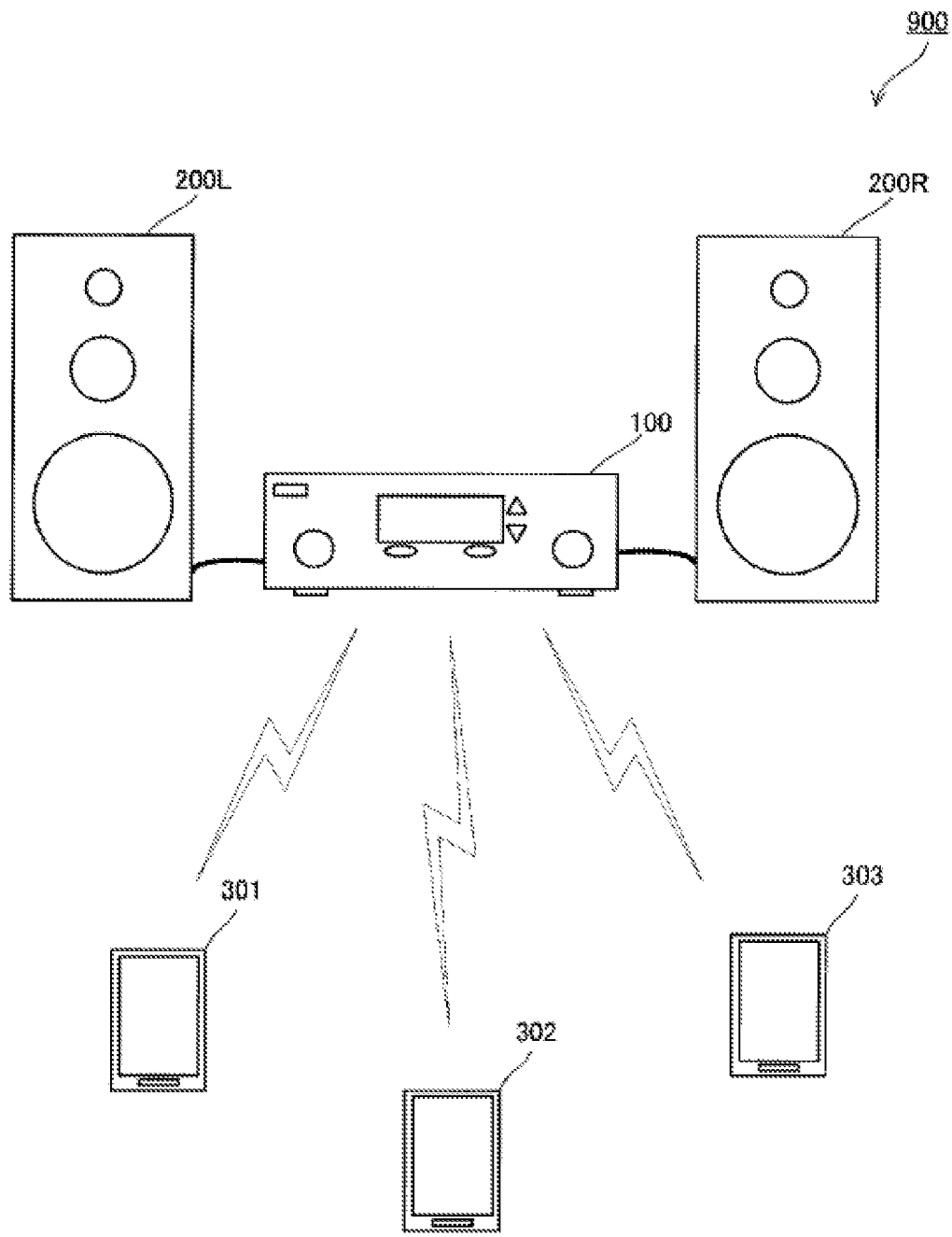
FIG. 1 is a diagram illustrating a general overview of a content playback system according to a first embodiment.

FIG. 1 is a diagram illustrating a general overview of the content playback system 900 according to a first embodiment. The content playback system 900 basically comprises an AV (Audio Visual) receiver 100, a speaker 200L, a speaker 200R, a smartphone 301, a smartphone 302, and a smartphone 303.

The smartphone 301, the smartphone 302, and the smartphone 303 are respectively connected to the AV receiver 100. In this example, the smartphone 301, the smartphone 302, and the smartphone 303 are connected to the AV receiver 100 according to the Bluetooth® standard. The smartphone 301, the smartphone 302, and the smartphone 303 can be connected to the AV receiver 100 according to another standard, for example Wi-Fi®. The connection between the AV receiver 100, and the smartphone 301, the smartphone 302, and the smartphone 303 is not limited to a wireless connection and can be a wired connection using a wired LAN, or the like.

The AV receiver 100 is one example of a content playback device. Any one of the smartphones 301 to 303 can serve as one example of the content playback device. In this case, speakers can be connected to the smartphones 301 to 303. Another specific example of the content playback device can include a personal computer, a TV, a set-top box, and an audio player. The smartphone 301, the smartphone 302, and the smartphone 303 are examples of user terminals. Another specific example of a user terminal can include a personal computer and a portable audio player.

In the content playback system 900 according to the first embodiment, the AV receiver 100 downloads (or streams) content from the smartphone 301, the smartphone 302, and the smartphone 303, and plays back the content. In the first embodiment, a case in which the content is audio data such as MP3 will be described. However, the content is not limited to audio data and can be video data such as MPEG4, or the like.

Figure 2A:
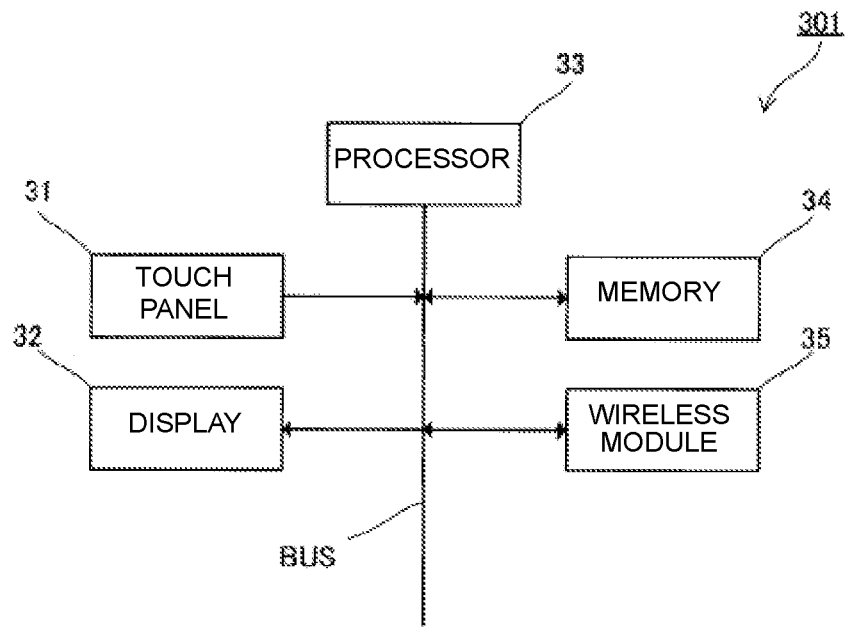
FIG. 2A is a hardware block diagram illustrating a part of the configuration of a smartphone according to the first embodiment.
Figure 2B:
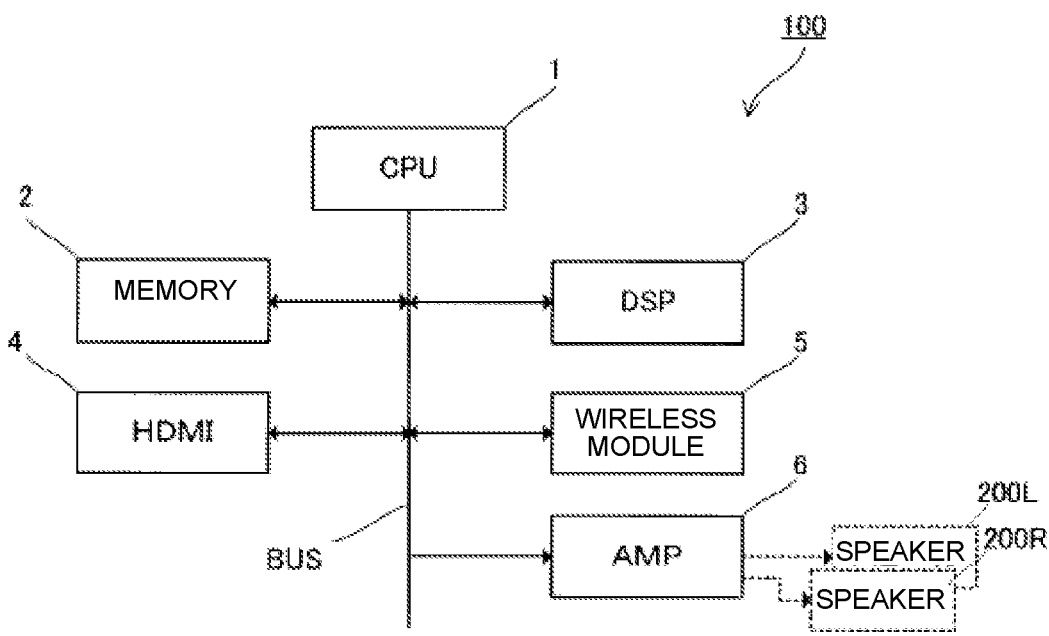
FIG. 2B is a hardware block diagram illustrating a part of the configuration of an AV receiver according to the first embodiment.

FIG. 2A is a block diagram illustrating a basic configuration of the smartphone 301. FIG. 2B is a block diagram illustrating a basic configuration of the AV receiver 100. FIG. 2A illustrates the configuration of the smartphone 301 as a representative of the smartphones 301 to 303. The smartphone 302 and the smartphone 303 also have the same hardware configuration and the same functions as the smartphone 301.

The smartphone 301 comprises a touch panel 31, a display 32, at least one processor 33, at least one memory 34, and a wireless module 35. Each configuration is connected to a common BUS.

The touch panel 31 receives operations from a user. The display 32 is a display unit, and present various information to the user. The smartphone 301 realizes a GUI (Graphical User Interface) via the touch panel 31 and the display 32.

The wireless module 35 is a wireless communication device conforming to the Bluetooth® standard. The wireless module 35 sends and receives various data to and from the AV receiver 100. Thus, the wireless module 35 is a wireless transceiver capable of transmitting and/or receiving wireless communication signals containing data. The term "wireless communication device" as used herein includes a receiver, a transmitter, a transceiver, a transmitter-receiver, and contemplates any device or devices, separate or combined, capable of transmitting and/or receiving wireless communication signals containing data. In addition to Bluetooth® communications, the wireless communication signals can be radio frequency (RF) signals, ultra-wide band communication signals, or any other type of signal suitable for wireless communications as understood in the field.

The memory 34 stores contents (audio data) and a program for operating the processor 33. The memory 34 is any computer storage device or any computer readable medium with the sole exception of a transitory, propagating signal. For example, the memory 34 can be nonvolatile memory and volatile memory, and can includes a ROM (Read Only Memory) device, a RAM (Random Access Memory) device, a hard disk, a flash drive, etc. The processor 33 integrally controls the various configurations and/or functions of the smartphone 301 by reading and executing programs stored in the memory 34. For example, the processor 33 receives a content playback request and transmits the content relating to the playback request to the AV receiver 100. The processor 33 can be a single processor or a plurality of processors.

The AV receiver 100 comprises a CPU (Central Processing Unit) 1, a memory 2, a DSP (Digital Signal Processor) 3, an HDMI® (High Definition Multimedia Interface) 4, a wireless module 5 and an AMP (Amplifier) 6. Each configuration is connected to a common BUS.

The CPU 1 integrally controls each configuration of the AV receiver 100. The CPU 1 carries out various operations by reading and executing programs stored in the memory 2. For example, the CPU 1 receives an audio data playback request from the smartphone 301, the smartphone 302, or the smartphone 303 (corresponding to the request reception unit according to the first embodiment). The memory 2 stores contents (audio data) and a program for operating the processor(s) of the CPU 1. The memory 2 is any computer storage device or any computer readable medium with the sole exception of a transitory, propagating signal. For example, the memory 2 can be nonvolatile memory and volatile memory, and can includes a ROM (Read Only Memory) device, a RAM (Random Access Memory) device, a hard disk, a flash drive, etc. The processor of the CPU 1 integrally controls the various configurations and/or functions of the AV receiver 100 by reading and executing programs stored in the memory 2. For example, the processor(s) of the CPU 1 transmits a content playback request via the wireless module 5 and receives the content relating to the playback request from the smartphone 301, the smartphone 302, or the smartphone 303 via the wireless module 5.

The CPU 1 registers the received playback request in the memory 2 as a reservation list R. The CPU 1 corresponds to the registration unit according to the first embodiment. Further, the CPU 1 transmits the registered reservation list R to the smartphone 301, the smartphone 302, and the smartphone 303 via the wireless module 5. The smartphones 301 to 303 display the reservation list R on the display 32 of each of the smartphones 301 to 303 to thereby present the reservation list R to the user of each of the smartphones 301 to 303. The wireless module 5 corresponds to a transmission unit or communication device according to the first embodiment. The term "communication device" as used herein refers to a hardware device capable of transmitting an analog or digital signal over a communication wire or wirelessly. The user of each of the smartphones 301 to 303 can thereby know the playback order of the audio data. The DSP 3 decodes and converts the audio data to digital audio signals and carries out various acoustic processing on the digital audio signals. The DSP 3 thereby realizes the playback unit according to the first embodiment. The various processing of the DSP 3 can be carried via software executed by the CPU 1. In this case, the CPU 1 corresponds to the playback unit. The HDMI 4 is an interface for inputting and outputting data related to contents, such as audio data. For example, if the content is video data such as MPEG, the HDMI 4 outputs (transmits) video signals relating to the video data, and displays the content on a display device, such as a TV.

The wireless module 5 is a communication module conforming to the Bluetooth® standard. The wireless module 5 sends and receives various data to and from the smartphone 301, the smartphone 302, or the smartphone 303. Thus, the wireless module 5 is a wireless transceiver capable of transmitting and/or receiving wireless communication signals containing data. The wireless module 5 is configured to communicate with the wireless module 35 of the smartphone 301, the smartphone 302, or the smartphone 303.

The AMP 6 is a circuit for amplifying audio signals. Audio signals that have been amplified by the AMP 6 are converted into analog audio signals and then output to the speaker 200L and the speaker 200R.

Figure 3:
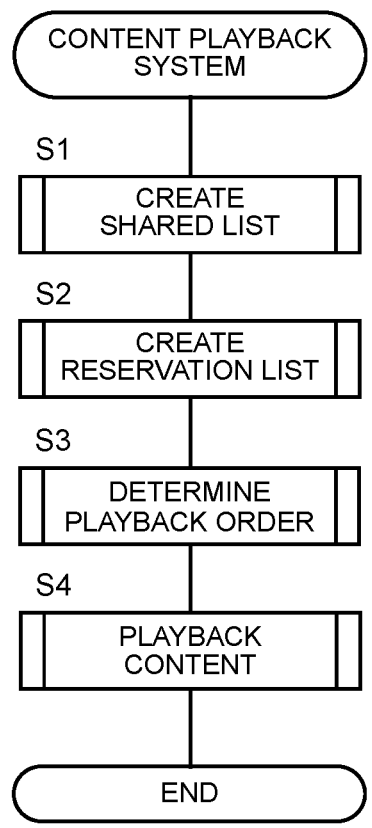
FIG. 3 is a flowchart illustrating the operation of the content playback system shown in FIG. 1.

The operation of the content playback system 900 will now be described with reference to FIG. 3. FIG. 3 is a flowchart illustrating the operation of the content playback system 900.

As shown in FIG. 3, the content playback system 900 first creates a shared list S (Step S1). A shared list S is a list created by merging the public lists of audio data that can be provided by the smartphone 301, the smartphone 302, and the smartphone 303. The audio data that can be provided by the smartphones 301 to 303 can be audio data stored (retained) in the smartphones 301 to 303, or data stored in an external device, such as a server. If the audio data are stored in an external device, the smartphones 301 to 303 download (or stream) the audio data from the external device.

A public list is a list of audio data that the users have permitted to make public from among audio data that can be provided by the users of the smartphone 301, the smartphone 302, and the smartphone 303.

Figure 4:
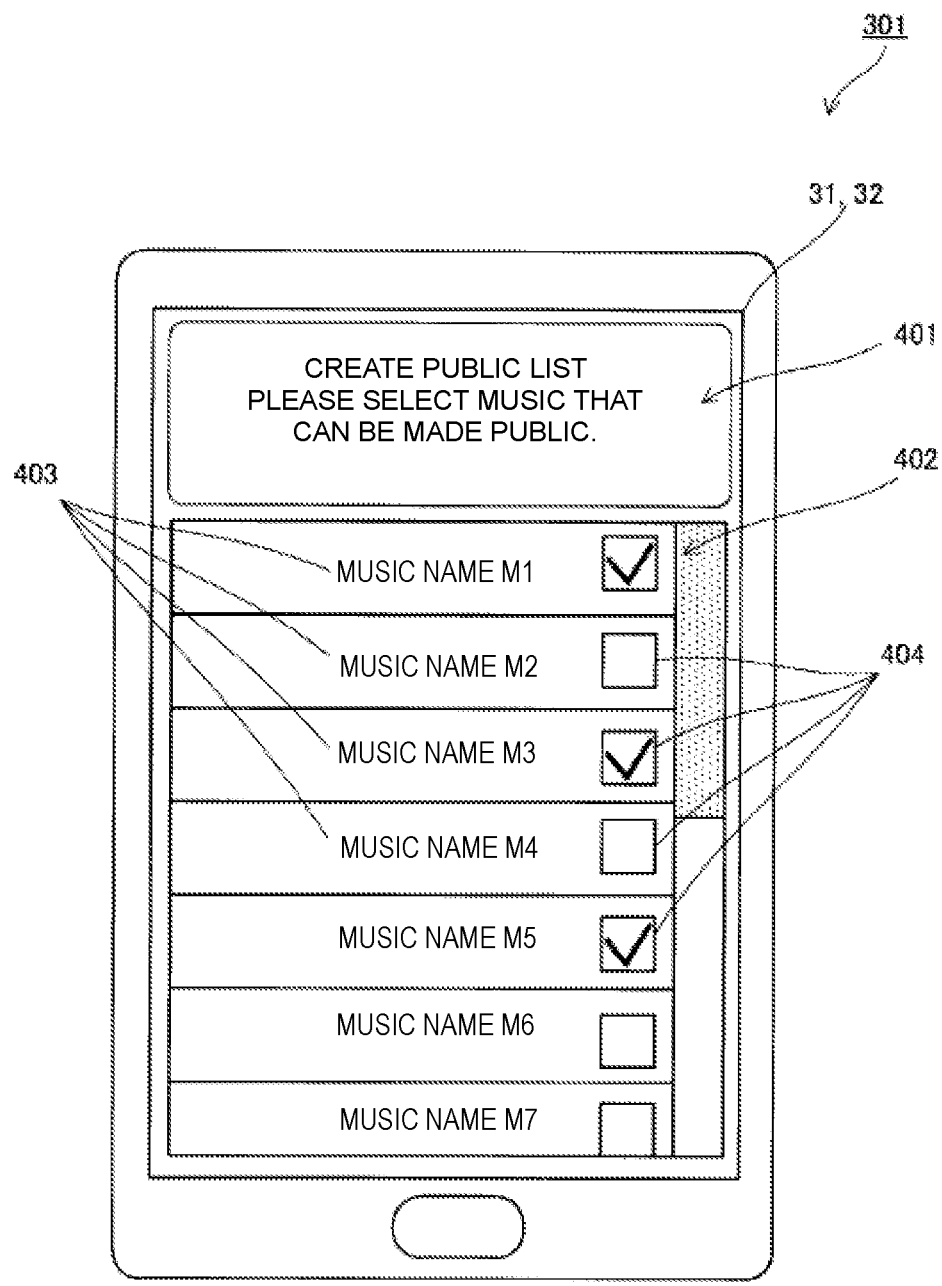
FIG. 4 is a diagram illustrating a display example of a smartphone when creating a public list in the first embodiment.

FIG. 4 is a diagram illustrating one example of the GUI of the smartphone 301 at the time of creating a public list. The smartphone 301 displays a list indicating the audio data stored in the host terminal (smartphone 301) on the display 32. The smartphone 301 receives an operation indicating whether or not to permit making each audio data public via the touch panel 31. In the example of FIG. 4, the user of the smartphone 301 selects the audio data titled music name M1, the audio data titled music name M3, and the audio data titled music name M5 as audio data that can be made public. In this case, as shown in FIG. 5A, the smartphone 301 registers the selected music name M1, the selected music name M3, and the selected music name M5 in the public list 301L. The public list 301L is stored in the memory 34. The smartphone 301 can automatically register all the audio data that can be provided by the host terminal (smartphone 301) in the public list. In this example, the audio data that can be provided by the users are stored in the smartphone of each user but can be stored in an external device such as a server.

Figure 6:
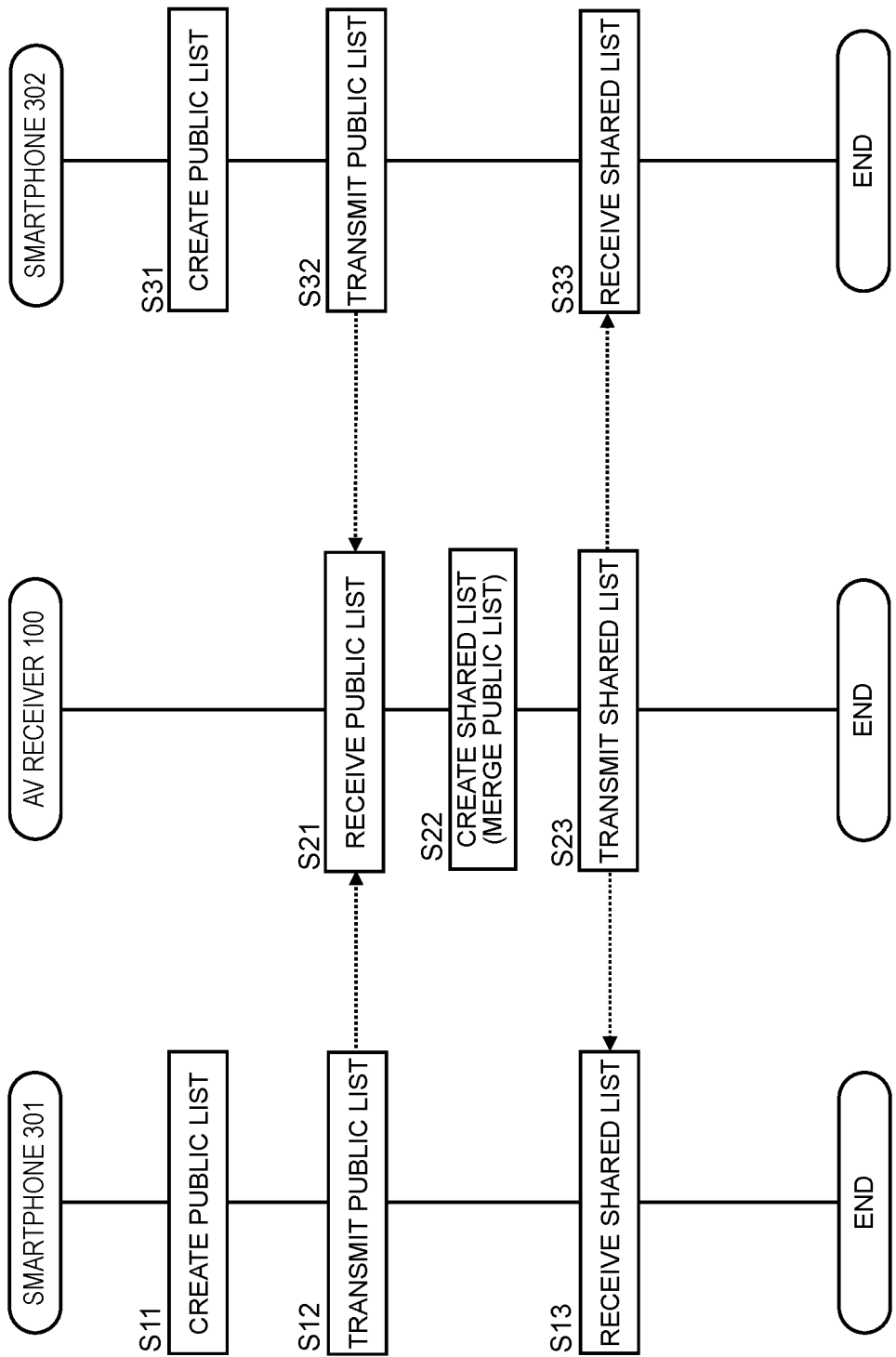
FIG. 6 is a flowchart illustrating the operation at the time of creating a shared list in the first embodiment of the present invention.

The smartphone 301 transmits the public list 301L to the AV receiver 100. That is, as shown in the flowchart of FIG. 6, the smartphone 301 creates a public list 301L (Step S11), and transmits the created public list 301L to the AV receiver 100 (Step S12). In the same manner, the smartphone 302 creates a public list 302L (Step S31) and transmits the created public list 302L to the AV receiver 100 (Step S32). The public lists 301L and 302L correspond to the first and second information according to the first embodiment. As an example, it is assumed that the smartphone 302 has created the public list 302L shown in FIG. 5B. That is, the user of the smartphone 302 designates the audio data titled music name M14, from among the audio data titled music names M11 to M15 stored in the smartphone 302 as capable of being made public.

In FIG. 6, an example is shown in which the smartphone 301 and the smartphone 302 create and transmit public lists 301L and 302L to the AV receiver 100. Similarly, the smartphone 303 creates and transmits a public list to the AV receiver 100. For example, it is assumed that the smartphone 303 transmits the audio data titled music name M12 as a public list.

The AV receiver 100 (the CPU 1 of the AV receiver 100) receives the public list 301L and the public list 302L respectively from the smartphone 301 and the smartphone 302 (the CPU 1 corresponds to the information reception unit according to the first embodiment) (Step S21). Further, although not shown, the AV receiver 100 also receives a public list from the smartphone 303. Here, as an example, it is assumed that audio data titled music name M12 is included in the public list of the smartphone 303. The AV receiver 100 (the CPU 1 of the AV receiver 100) merges the public lists received from the smartphones 301 to 303, and creates a shared list S. The CPU 1 corresponds to the electronic controller according to the first embodiment) (Step S22). That is, as shown in FIG. 5C, a shared list S including the titles of the music name M1, the music name M3, the music name M5, the music name M12, and the music name M14 is created.

The shared list S includes information indicating the music names and identification information of the terminal in which each of the audio data is stored. In the example shown in FIG. 5C, the terminal names are used as the identification information of the terminals.

Next, the AV receiver 100 transmits the created shared list S to all of the connected smartphones (Step S23). In the example shown in FIG. 6, the AV receiver 100 is shown to transmit the shared list S to the smartphone 301 and the smartphone 302, but the shared list S is also transmitted to the smartphone 303. The smartphone 301, the smartphone 302, and the smartphone 303 receive the shared list S from the AV receiver 100 (Steps S13 and S33).

Figure 7:
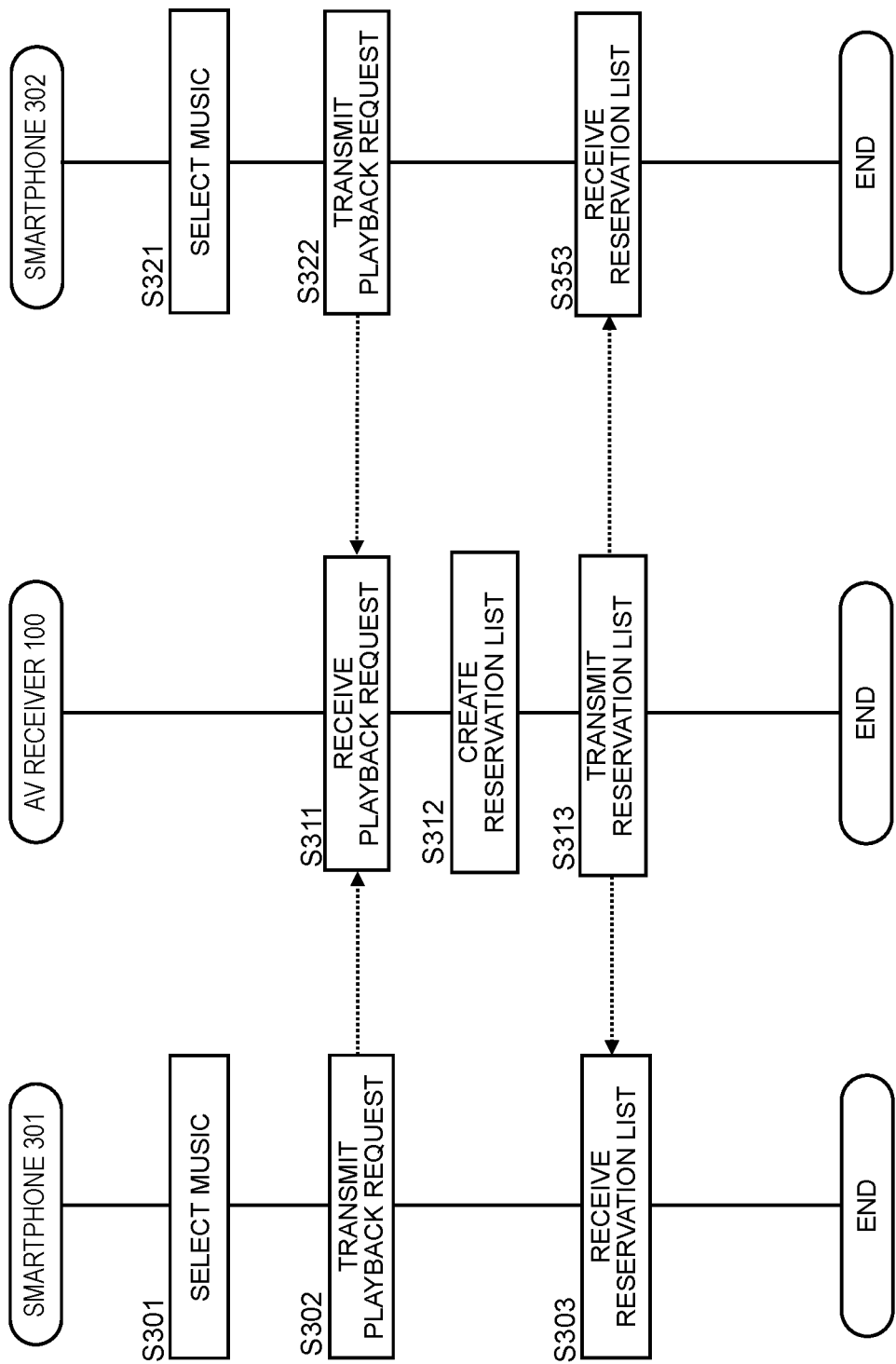
FIG. 7 is a diagram illustrating the operation at the time of creating a reservation list in the first embodiment.

Next, the content playback system receives a playback request from a user and creates a reservation list R (S2 in FIG. 3). FIG. 7 is a flowchart showing the procedures of receiving a playback request and creating a reservation list R.

Figure 8:
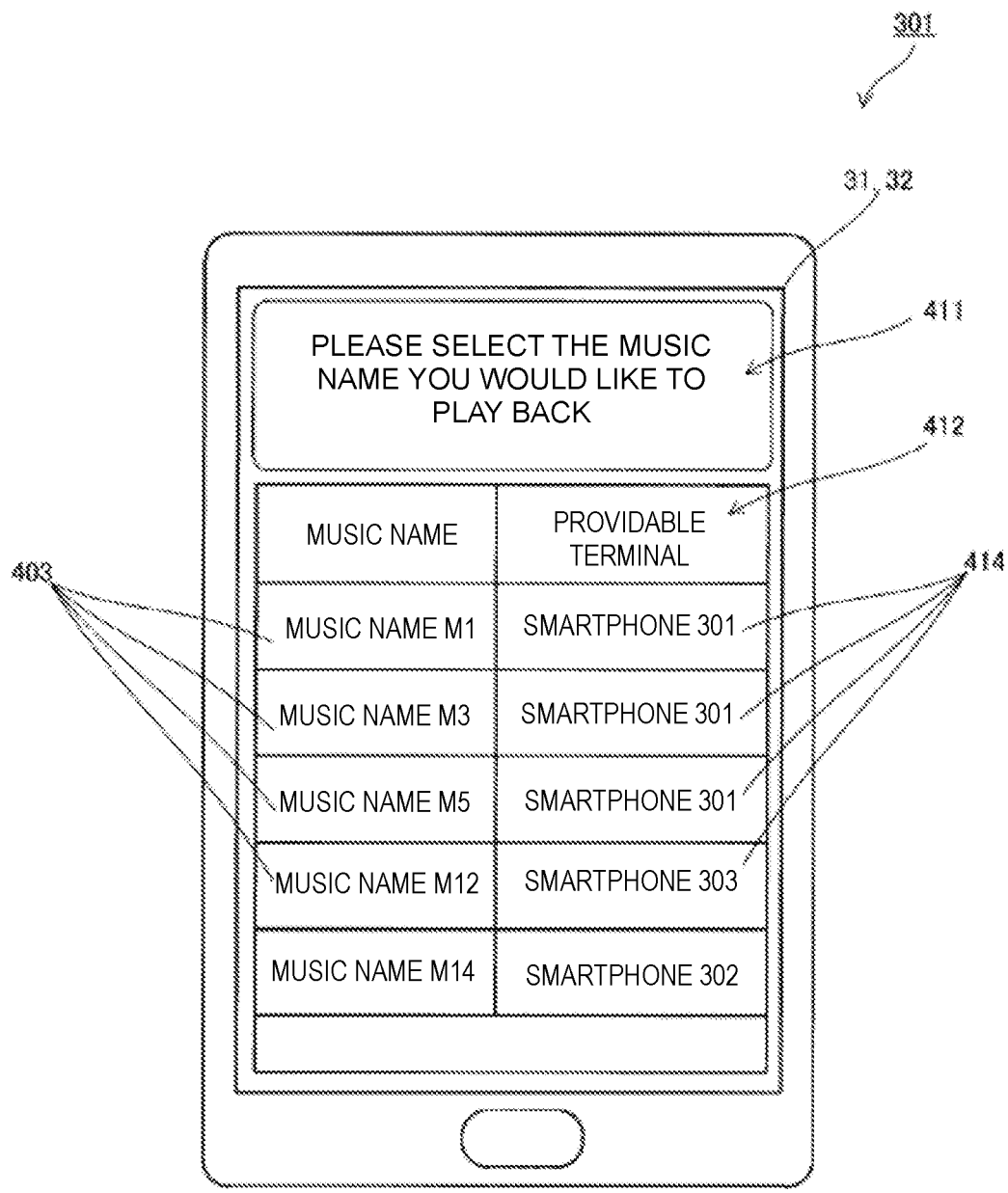
FIG. 8 is a diagram illustrating a display example of a smartphone when selecting audio data to be played back in the first embodiment.

First, the smartphone 301 and the smartphone 302 cause the users to select music names using the GUI. For example, as shown by the display example of the smartphone 301 in FIG. 8, the smartphone 301 controls the display 32 to show a display prompting the user to select a music name to be played back in a display area 411. The smartphone 301 displays the shared list S as shown in FIG. 5C in the display area 412. The user of the smartphone 301 selects one of the music names M403 displayed in the display area 412 (Step S301).

When the user selects a music name, the smartphone 301 transmits the selected music name to the AV receiver 100 as a playback request (Step S302). Similarly, the smartphone 302 receives an operation to select a music name included in the shared list S (Step S321) and transmits a playback request including the selected music name to the AV receiver 100 (Step S322). Although not shown, the smartphone 303 also receives an operation to select a music name included in the shared list S and transmits a playback request including the selected music name to the AV receiver 100.

The AV receiver 100 receives playback requests from the smartphone 301, the smartphone 302, and the smartphone 303 (Step S311). The AV receiver 100 then creates a reservation list R including the music names included in each of the playback requests (Step S312).

Figure 9A:
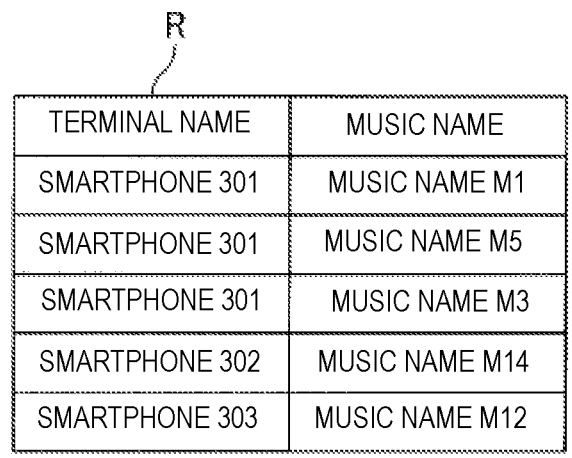
FIG. 9A is a diagram illustrating an example of a reservation list in the first embodiment.

The AV receiver 100 registers the music names included in the playback requests in the reservation list R in the order that the playback requests are received. That is, at this point in time, the reservation list R is a list in which the music names indicated by the received playback requests are arranged in the order that the playback requests are received. The arrangement order of the music names in the reservation list R will be the playback order of the music pieces. The reservation list R is stored in the memory 2. For example, as shown in FIG. 9A, if the playback request of the music name M1, the playback request of the music name M5, the playback request of the music name M3, the playback request of the music name M14, and the playback request of the music name M12 are received in this order, the first item in the reservation list R will be the music name M1, and the last item will be the music name M12. Therefore, at the present time, the music name M1 is the music piece that will be played back first.

The AV receiver 100 thereafter transmits the created reservation list R to the smartphone 301, the smartphone 302, and the smartphone 303 (Step S313). The smartphone 301, the smartphone 302, and the smartphone 303 receive the reservation list R from the AV receiver 100 (Steps S303 and S323).

Figure 10:
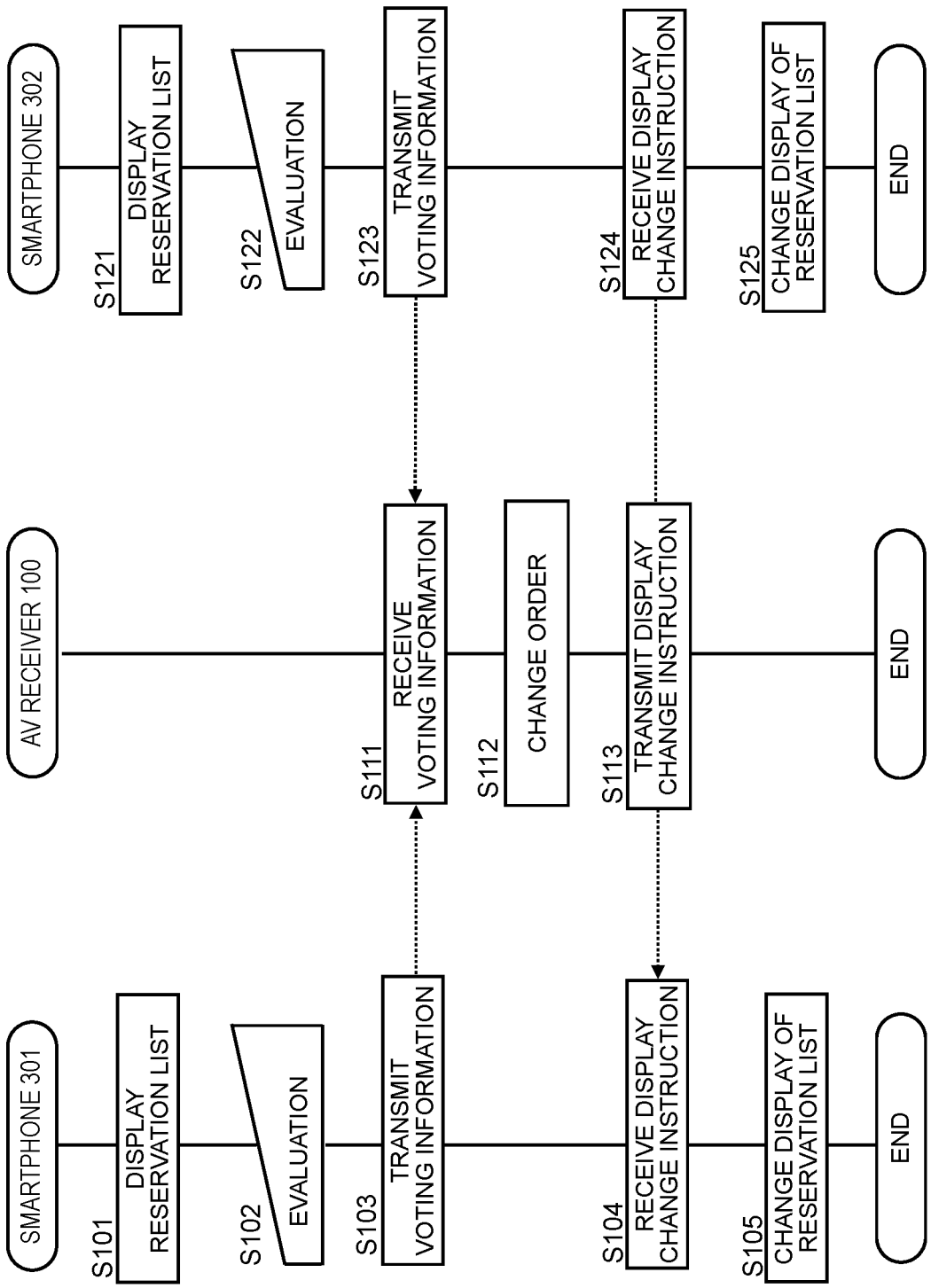
FIG. 10 is a flowchart illustrating the operation at the time of determining the playback order in the first embodiment.

The content playback system thereafter carries out a determination process of the playback order (Step S3 in FIG. 3). FIG. 10 is a flowchart illustrating the operations of the AV receiver 100, the smartphone 301, and the smartphone 302 in the determination process of the playback order. Although the operation of the smartphone 303 has been omitted in FIG. 10, the smartphone 303 also carries out the same operations as the smartphone 301 and the smartphone 302.

First, the smartphone 301 and the smartphone 302 display the reservation list R (Steps S101 and S121). Then, the smartphone 301 and the smartphone 302 receive evaluations for each audio data of the reservation list R (Steps S102 and S122).

Figure 11:
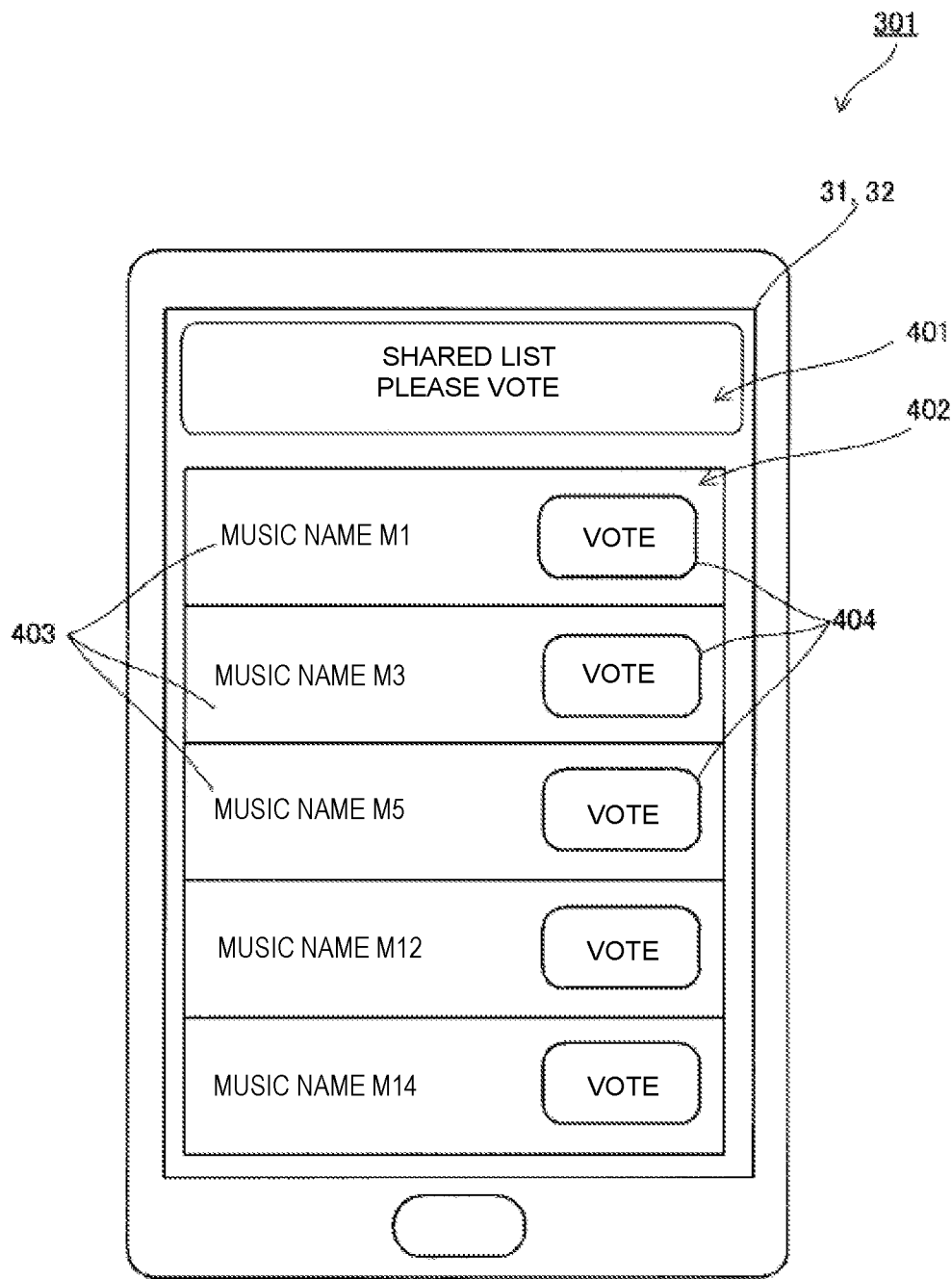
FIG. 11 is a diagram illustrating a display example of a smartphone when receiving a voting operation in the first embodiment.

The evaluation method is carried out, for example, as follows. FIG. 11 is a diagram illustrating a display example of the smartphone 301.

As shown in FIG. 11, the smartphone 301 displays a prompt to vote for each audio data of the reservation list R in the display area 401 of the display 32. Furthermore, the smartphone 301 displays the music names M403 of each audio data of the reservation list R and voting buttons 404 corresponding to each audio data in the display area 402 of the display area 32.

The user of the smartphone 301 is able to vote for any one of the audio data from among the plurality of music data in the reservation list R by touching the display area of one of the voting buttons 404.

As shown in the flowchart of FIG. 10, the smartphone 301 transmits voting information that indicates the voted music data to the AV receiver 100 (Step S103). Similarly, the smartphone 302 transmits voting information that indicates the voted audio data to the AV receiver 100 (Step S123).

Figure 9B:
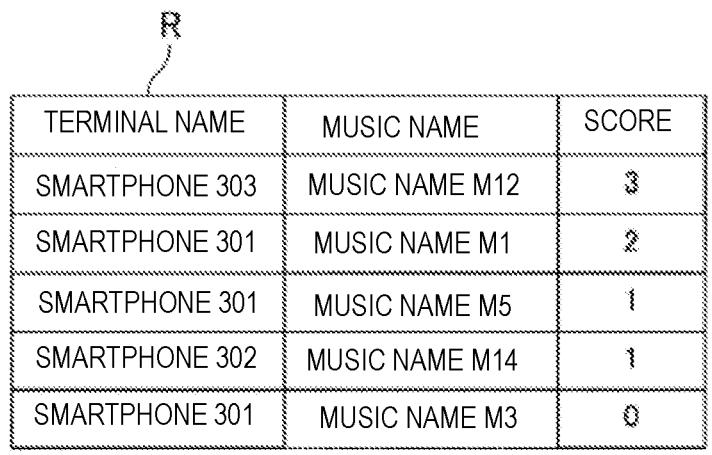
FIG. 9B is a diagram illustrating an example of a reservation list after the order has been changed in the first embodiment.

The AV receiver 100 receives evaluations of the audio data by receiving voting information from each of the smartphones 301 to 303 (Step S111). The CPU 1 of the AV receiver 100 thereby realizes the operation of an evaluation reception unit according to the first embodiment. The AV receiver 100 then changes (determines) the playback order based on the received voting information (Step S112). For example, the AV receiver 100 assigns scores to the audio data according to the number of votes. The score for audio data that did not receive any votes from any of the smartphones is "0" points. The AV receiver 100 sorts (arranges) the reservation list R in descending order of score. For example, as shown in FIG. 9B, the audio data of the music name M12, which received three votes, has a score of "3" and is at the top of the list. The score for audio data of the music name M3 that did not receive any votes from any of the smartphones is "0" points and appears at the bottom of the list. In the case of the same number of votes the audio data for which a playback request was received first is played back first. In the example of FIG. 9B, the music name M5 and the music name M14 received the same number of votes, and are assigned the same score of "1." In this case, the audio data of the music name M5, for which a playback request was received first, will be played back before the music name M14. In this manner, the CPU 1 of the AV receiver 100 realizes the determination unit (changing unit) according to the first embodiment.

Figure 12:
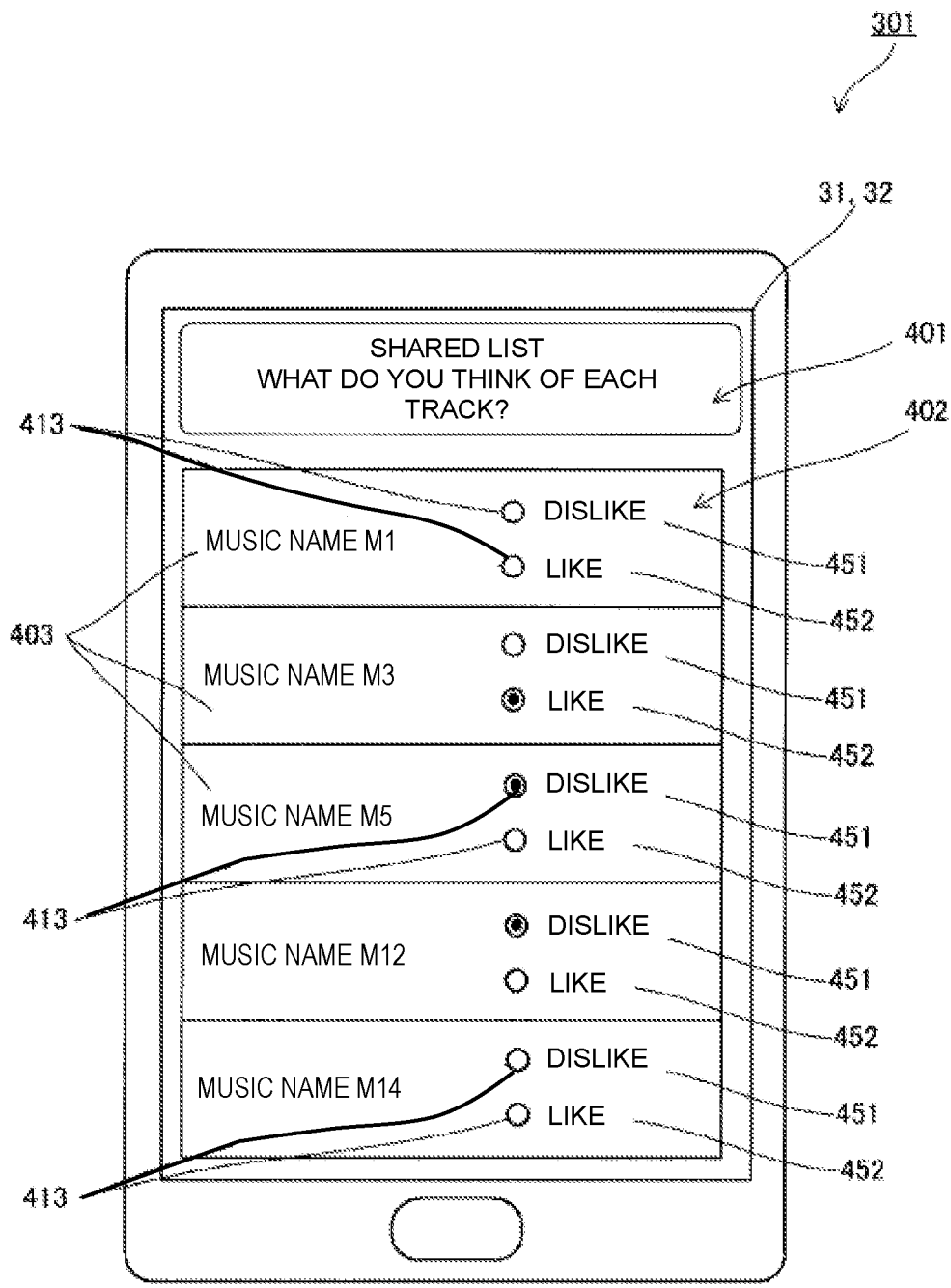
FIG. 12 is a diagram illustrating a modified example of the evaluation method in the first embodiment.

The evaluation method can be, for example, a method of receiving an operation for selecting liking (preference) or disliking, such as "like" and "dislike," as shown in FIG. 12. In this case, the smartphone 301 displays two radio buttons 413 in association with each of the music names M403. A character string 451 indicating liking is associated with the display of one of the two radio buttons 413. A character string 452 indicating disliking is associated with the display of the other of the two radio buttons 413. The user selects either "like" or "dislike" by selecting one of the radio buttons 413 with respect to the music data indicated by the music name M403 of each music data. The AV receiver 100 adds 1 point when "like" is selected and subtracts 1 point when "dislike" is selected.

Figure 13:
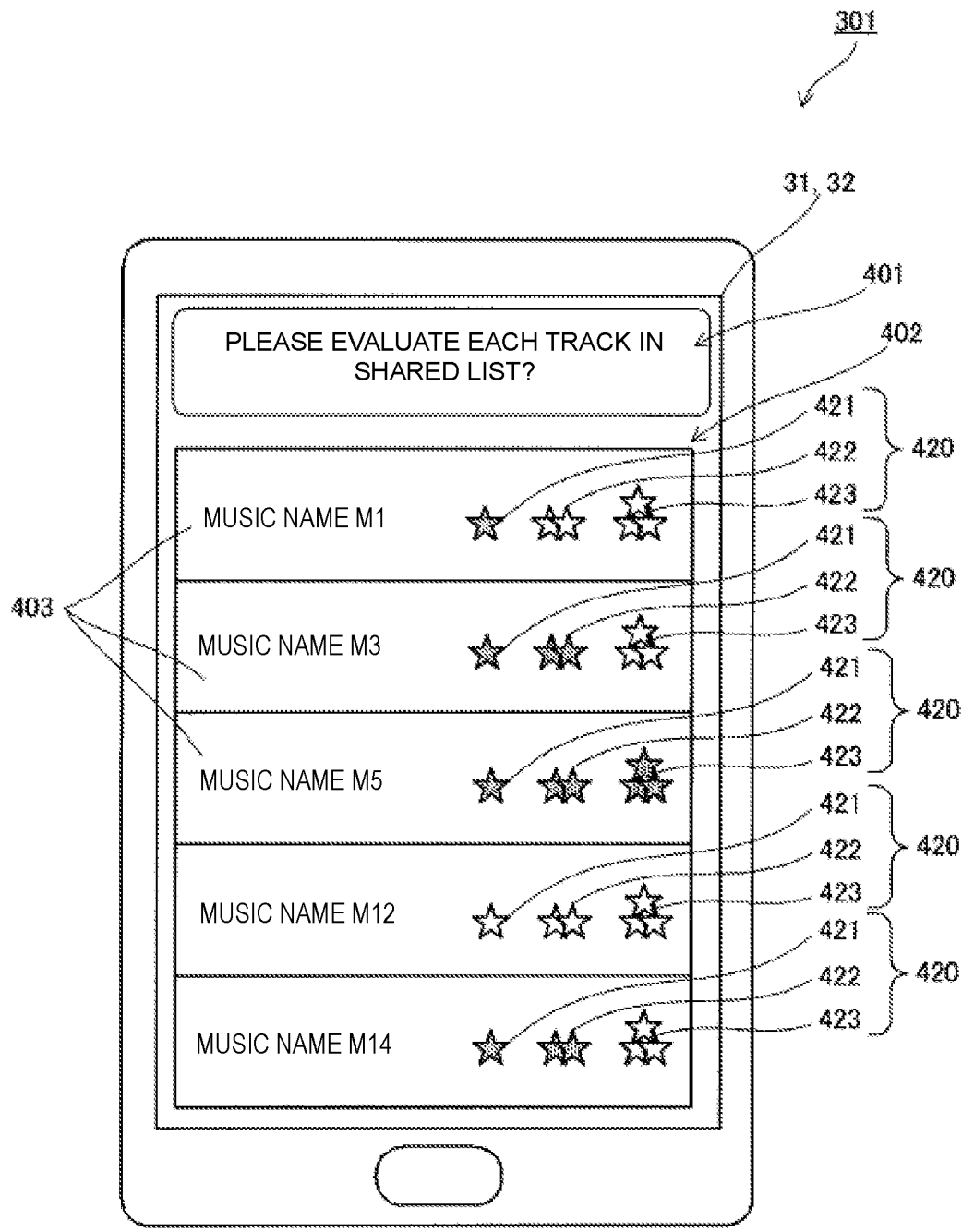
FIG. 13 is a diagram illustrating a modified example of the evaluation method in the first embodiment.

As shown in FIG. 13, the evaluation method can be a method of receiving a multi-stage evaluation. In the example of FIG. 13, the smartphone 301 displays an instruction prompting an evaluation of each content in the shared list S in the display area 401. The smartphone 301 displays the music name M403 of each music data and evaluation marks 420 association therewith in the display area 402. The evaluation marks 420 include a mark 421, a mark 422, and a mark 423. The mark 421 indicates the lowest evaluation of a three-stage evaluation. The mark 423 indicates the highest evaluation of a three-stage evaluation. The mark 422 indicates the second lowest (that is, the second highest) evaluation of a three-stage evaluation. By touching one of the display areas of the mark 421, the mark 422, and the mark 423, the user assigns an evaluation of one of the stages with respect to the corresponding music data. The AV receiver 100 calculates the score for the music data as an average value of scores corresponding to the evaluation stages. For example, the AV receiver 100 sets the evaluation of the first stage as 1 point, the evaluation of the second stage as 2 points, and the evaluation of the third stage as 3 points. The AV receiver 100 calculates the total score for each music data of the shared list S. Furthermore, by dividing the calculated total score by the number of smartphones for which an evaluation operation was received, the AV receiver 100 obtains an average value.

Then, again with reference to FIG. 10, the AV receiver 100 transmits a display change instruction to the smartphone 301, the smartphone 302, and the smartphone 303 (Step S113). A display change instruction causes the smartphone 301, the smartphone 302, and the smartphone 303 to rearrange the order of the music names included in the reservation list R that is being displayed or to append the display of the score to the music name of each audio data.

When a display change instruction (Step S104 and S124) is received, the smartphone 301 and the smartphone 302 rearrange and display the order of the music names included in the reservation list R, as shown in FIG. 9B, and display the score associated with each music name (Steps S105 and S125). The user of each of the smartphones 301 to 303 is able to enjoy selecting music while observing the voting results of the other users.

In the example described above, a user first makes a playback request, after which an evaluation of each audio data of the reservation list R is received, but no limitation is imposed thereby. Evaluations for audio data can be received when the shared list S is being displayed on each of the smartphones 301 to 303. In this case, when a user votes for audio data included in the shared list S, a playback request for the audio data as well as voting information are transmitted to the AV receiver 100. Furthermore, the playback request and the voting information can be transmitted after an evaluation of all of the audio data included in the shared list S is conducted. After playback requests from all of the connected smartphones and voting information from all of the connected smartphones are received, the AV receiver 100 changes (determines) the playback order of the audio data included in the reservation list R.

Figure 14:
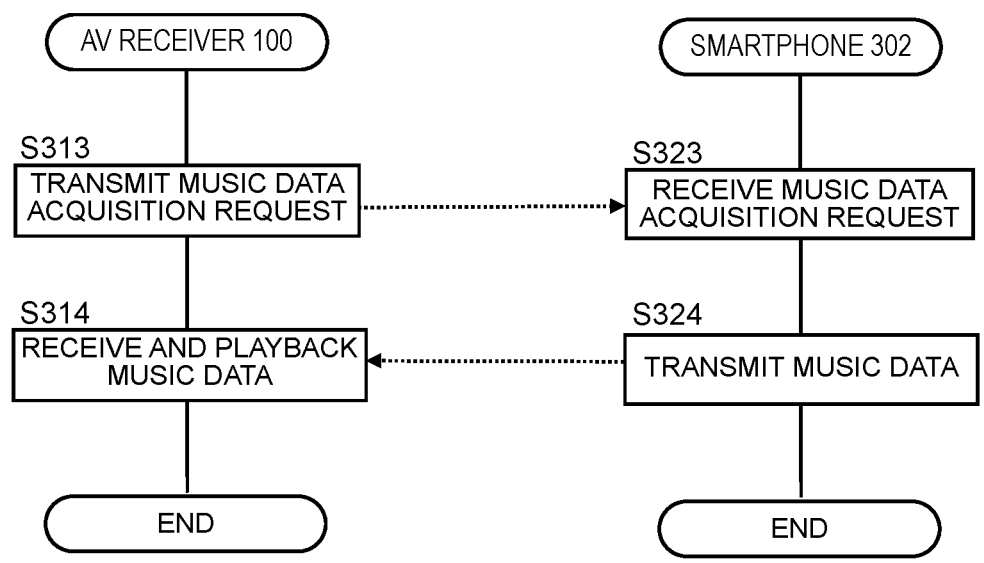
FIG. 14 is a flowchart illustrating the content playback operation in the first embodiment.

Next, the AV receiver 100 plays back the audio data according to the playback order indicated by the reservation list R (Step S4 in FIG. 3). FIG. 14 is a flowchart illustrating the content playback operation. When the playback timing for the audio data indicated in the reservation list R is reached, the AV receiver 100 transmits an audio data acquisition request to the smartphone associated with said audio data (Step S313). In the example shown in FIG. 14, an acquisition request has been transmitted to the smartphone 302, and illustrates the case in which the playback timing of music name M14 has been reached.

When receiving an audio data acquisition request (Step S323), the smartphone 302 transmits the audio data of the music name M included in the acquisition request to the AV receiver 100 (Step S324).

The AV receiver 100 receives audio data from the smartphone 302 and plays back the audio data (Step S314). The AV receiver 100 can play back the audio data after downloading all of the data for one track. The AV receiver 100 can carry out streaming playback of the audio data.

The AV receiver 100 removes the audio data for which playback has been completed from the reservation list R and plays back the audio data of the music name M1, which now appears at the top of the list.

In this manner, the content playback system is able to provide a means of enjoyment, in which a plurality of users bring together content that each user can provide and make requests while evaluating each content, to thereby evaluate contents together with the other users. In addition, in the content playback system, since the playback order is changed (determined) according to the result of the users' evaluations, it is possible to realize a playback order that reflects the desires of the users.

In the description above, the case in which the AV receiver 100 creates the shared list in Step S1, creates the reservation list R in Step S2, determines the playback order in Step S3, and plays back the content in Step S4 was described. However, the present embodiment is not limited to such an example. For example, the smartphone 303 can create the shared list in Step S1, create the reservation list R in Step S2, determine the playback order in Step S3, and play back the content in Step S4. That is, the processing that is carried out by the AV receiver 100 in Steps S1 to S4 can be carried out by the smartphone 303 instead of the AV receiver 100. In this case, the processing carried out between the AV receiver 100 and the smartphone 303, for example, the sending and receiving process of the shared list, can be omitted, since the source and the destination of transmission are the same. Alternatively, the smartphone 303 can create the shared list in Step S1, create the reservation list R in Step S2, and determine the playback order in Step S3, while the AV receiver 100 plays back the content in Step S4. In this case, the processing that is carried out by the AV receiver 100 in Steps S1 to S3 is carried out by the smartphone 303 instead of the AV receiver 100. Additionally, after Step S3, the smartphone 303 transmits the playback order determined by the AV receiver 100. As a result, the AV receiver 100 can play back the contents according to the determined playback order in Step S4. According, a content playback system basically includes a communication device (e.g. one of the wireless module 5 or the wireless module 35), an electronic controller (e.g. one of the CPU 1 or the processor 33) and a content playback device (e.g. one of the AV receiver 100 and the smartphone 303). In the content playback system, the communication device and the electronic controller can be all contained in the content playback device. Alternatively, in the content playback system, the content playback device can be separate from the communication device and the electronic controller. In either case, the communication device (disposed in either the AV receiver 100 or the smartphone 303) is configured to receive at least one playback request indicating a content from at least one user terminal and an evaluation with respect to the content from one of the at least one user terminal, and the electronic controller (disposed in either the AV receiver 100 or the smartphone 303) is configured to register the content in a reservation list and determine a playback order of the contents registered in the reservation list based on the evaluation. The content playback device (e.g. either the AV receiver 100 or the smartphone 303) is configured to play back contents registered in the reservation list according to the playback order.

First Modified Example

The example described above is an operation in which the playback of audio data is carried out after evaluations of all of the audio data registered in the reservation list R are received, and the playback order of the audio data included in the reservation list R has been changed (determined). If the number of audio data registered in the shared list S or the number of audio data registered in the reservation list R is small, such an operation is favorable because it takes less time until the start of playback of the audio data.

Figure 15:
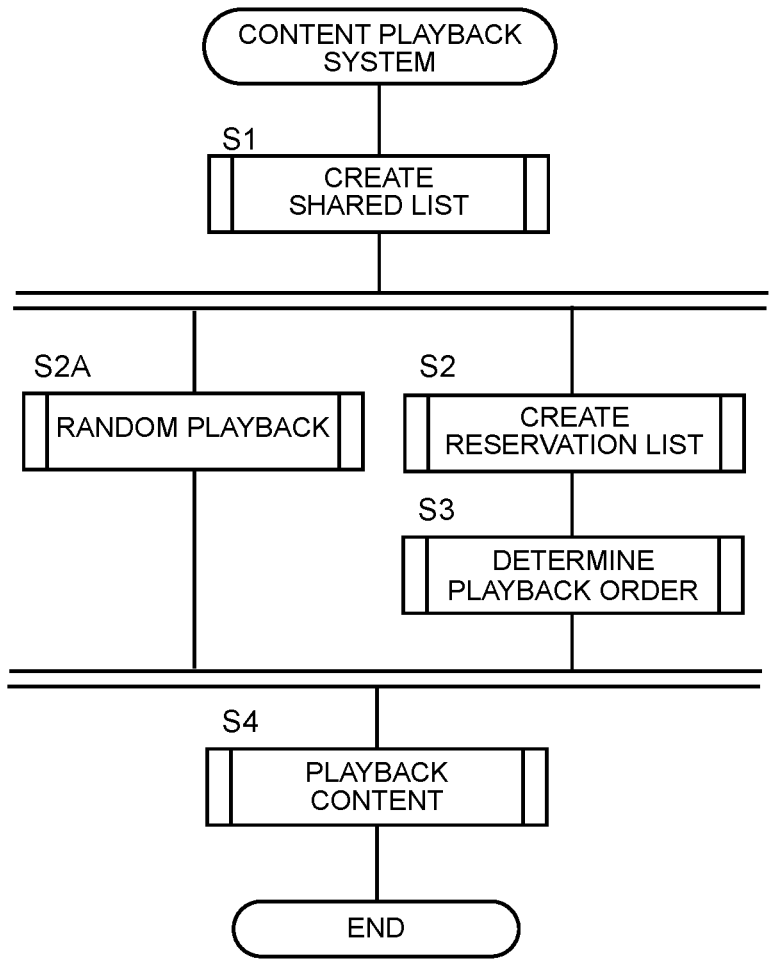
FIG. 15 is a flowchart illustrating the operation of the content playback system according to a first modified example of the first embodiment.

However, as shown in the flowchart of FIG. 15, the AV receiver 100 can carry out an operation to first play back the audio data registered in the reservation list R according to a predetermined condition, then receive evaluations of the audio data and change (determine) the playback order of the audio data included in the reservation list R.

In this case, the AV receiver 100 randomly selects audio data from the audio data in the shared list S and plays back the selected audio data (Step S2A). The playback of the audio data is not limited to random playback. The playback of the audio data can be playback following the arrangement order of the music data in the shared list S. Alternatively, the AV receiver 100 can play back the audio data of a playback request when a playback request is first received. Alternatively, the AV receiver 100 can randomly select audio data from the audio data in the reservation list R and play back the selected audio data when playback requests are received from all of the connected smartphones.

Each user makes a playback request while predetermined audio data are being played back in the AV receiver 100. As a result, the AV receiver 100 creates a reservation list R while the predetermined audio data are being played back. The user then evaluates each audio data in the reservation list R while the predetermined audio data are being played back.

The AV receiver 100 then receives the evaluation of each audio data and changes the playback order of the audio data included in the reservation list R (Step S3). When the order of the audio data included in the reservation list R is changed, the AV receiver 100 plays back the next audio data after the playback of the currently playing audio data is completed, according to the playback order indicated by the reservation list R after the change.

Alternatively, each user can evaluate each audio data in the shared list S while predetermined audio data are being played back in the AV receiver 100. As a result, the AV receiver 100 receives playback requests and evaluation of each audio data and creates a reservation list R while the predetermined audio data are being played back.

A track that is currently being played back or has already been played back can be configured to not be played back a second time, or can be played back again when receiving an evaluation.

If the number of audio data in the shared list S or the number of audio data registered in the reservation list R is large and the number of users is small, then such a situation is favorable because it takes less time until the start of playback of the audio data.

Second Modified Example

Figure 16:
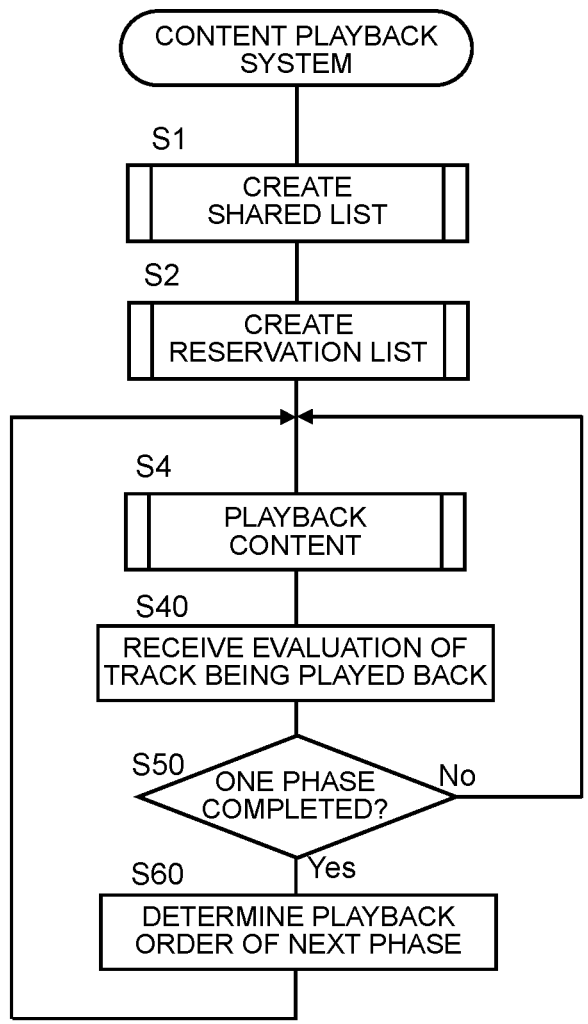
FIG. 16 is a flowchart illustrating the operation of the content playback system according to a second modified example of the first embodiment.

Next, FIG. 16 is a flowchart illustrating the operation of the content playback system according to the second modified example. The example described above is an operation for receiving an evaluation of each audio data registered in the shared list S or the reservation list R. In the content playback system according to the second modified example, an evaluation of the audio data currently being played back is received.

As shown in FIG. 16, after creating a reservation list R, the AV receiver 100 first starts playback of the audio data from the top of the reservation list R (Steps S2 to S4). That is, the AV receiver 100 starts playback of the audio data of a playback request when a playback request is first received.

Figure 17:
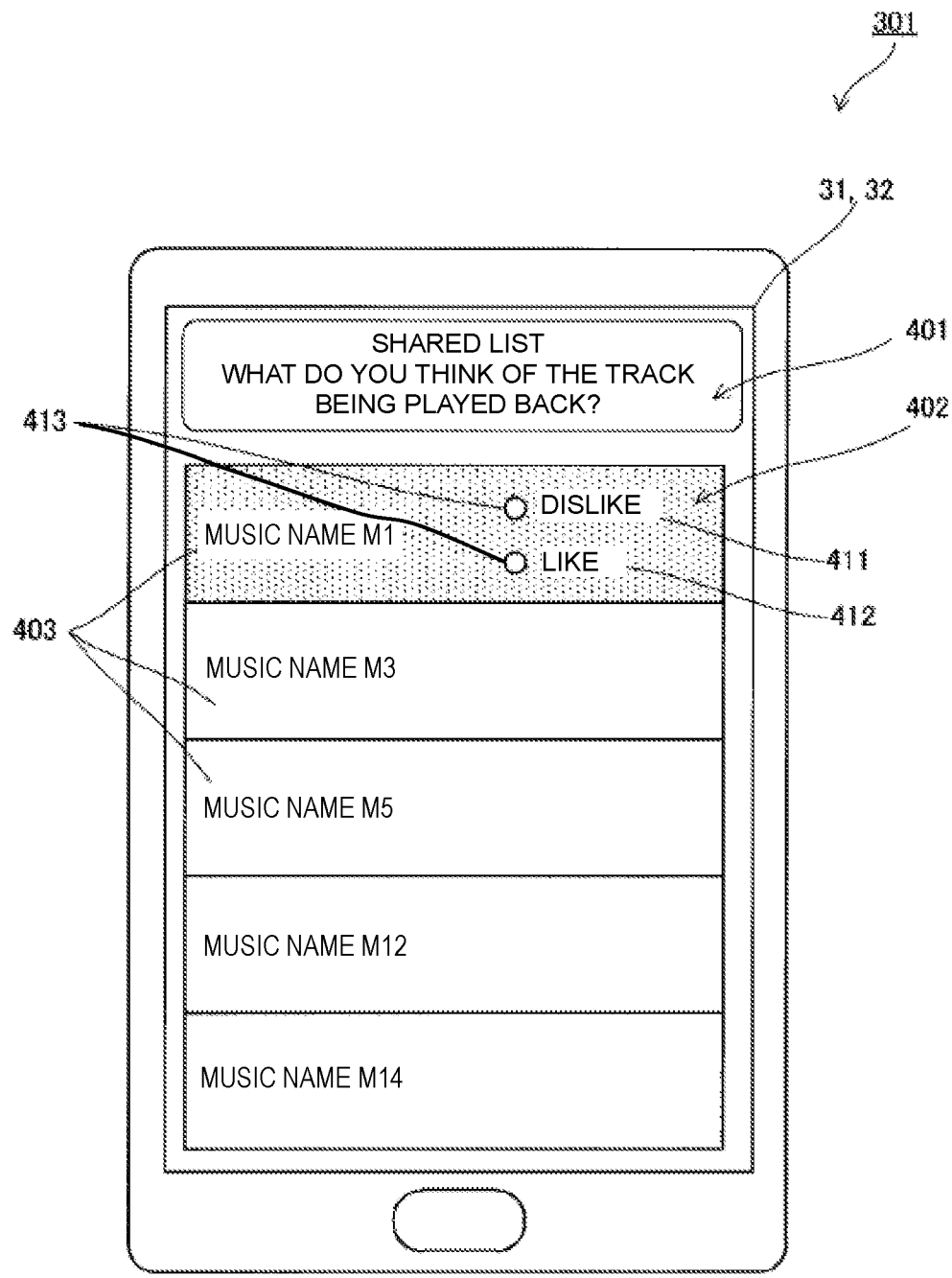
FIG. 17 is a diagram illustrating a display example of a smartphone in the second modified example of the first embodiment.

Then, the AV receiver 100 receives evaluations of the audio data currently being played back from each of the smartphones 301 to 303 (Step S40). As shown in FIG. 17, the name of the track that is currently being played back is displayed on, for example, the smartphone 301. In this example, only the display area 402 corresponding to the track being played back is displayed with a contrasting or different color from the other tracks being displayed on the smartphone 301. As a result, the user is able to determine which track is currently being played back. Furthermore, in this example, two radio buttons 413 and a character strings 411 and 412 indicating disliking or liking are displayed only for the track that is currently being played back. Accordingly, the smartphone 301 receives the user's evaluation regarding the track that is currently being played back by the AV receiver 100.

Thereafter, as shown in FIG. 16, the AV receiver 100 determines whether or not playback for one phase has ended (Step S50). The term "one phase" refers to the period from when playback requests are made for one track from each of the smartphones 301 to 303 connected to the AV receiver 100 to the end of playback of all the tracks for which playback requests were made. The AV receiver 100 continues playback of the audio data of the reservation list R until playback for the one phase is completed. However, if a playback request is again made from the same smartphone within the one phase, the playback request from that smartphone is placed at the tail end of the reservation list R (that is, the next phase).

When playback for the one phase is completed, the AV receiver 100 determines the playback order of the next phase (Step S60). Here, the AV receiver 100 tabulates the evaluations for each of the audio data of the users for each phase. In the next phase, the AV receiver 100 changes (determines)

the playback order of the audio data included in the reservation list R such that the audio data indicated by the playback requests from the smartphones with a higher evaluation will be played back first. As a result, in the next phase, the audio data indicated by a playback request from the user of the smartphone that provided the audio data that received a higher evaluation will be preferentially played back.

Alternatively, in the next phase, the AV receiver 100 can increase the number of playback requests that can be received (accepted) from the smartphone that provided the audio data with a higher evaluation as compared with the other smartphones. For example, in the next phase, the AV receiver 100 can allow reception of up to two playback requests from one of the smartphones that provided the audio data with a higher evaluation, and allow reception of only one playback request from the other smartphones. As a result, the user of the smartphone that provided the audio data that received a higher evaluation can make more playback requests than the other users in the next phase.

Alternatively, the AV receiver 100 can give preferential treatment to the user that made the playback request for the audio data that received a higher evaluation instead of the user of the smartphone that provided the audio data with a higher evaluation. In this case, when receiving playback requests, the AV receiver 100 stores each playback request and the identification information (terminal name) of the associated smartphone.

Alternatively, the AV receiver 100 can give preferential treatment to both the user of the smartphone that provided the audio data with a higher evaluation and the user that made the playback request for the audio data that received a higher evaluation. In this case as well, when receiving playback requests, the AV receiver 100 stores each playback request and the identification information (terminal name) of the associated smartphone.

Third Modified Example

Figure 18:
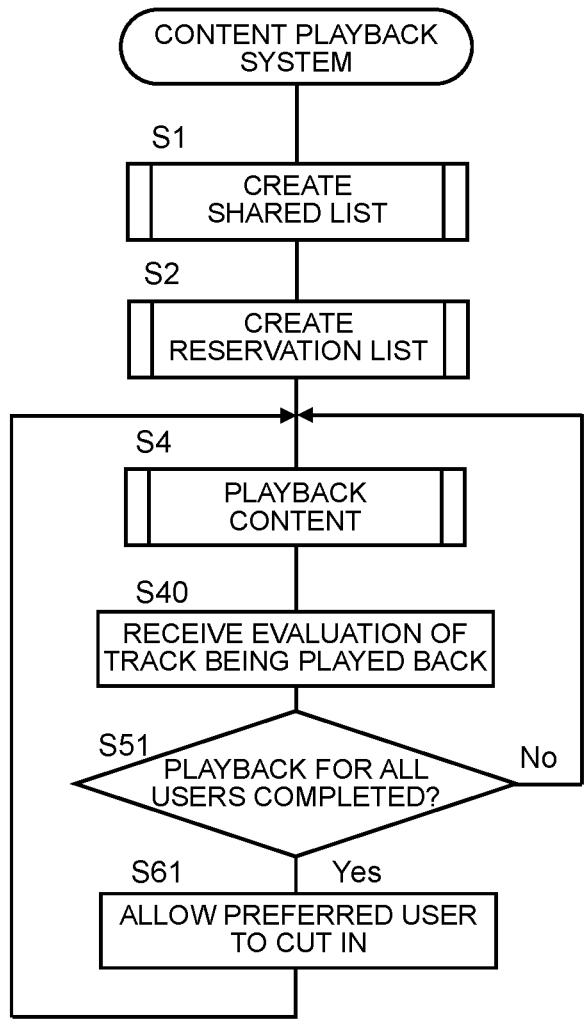
FIG. 18 is a flowchart illustrating the operation of the content playback system according to a third modified example of the first embodiment.

FIG. 18 is a flowchart illustrating the operation of the content playback system according to the third modified example. The content playback system according to the third modified example receives evaluations of the audio data being played back from each of the smartphones 301 to 303 in Step S40; thereafter, when a playback request is made for one track from each of the smartphones 301 to 303 connected to the AV receiver 100, the content playback system determines whether or not the playback of the requested tracks has been completed. If a playback of audio data based on a playback request from at least one of all the smartphones 301 to 303 has not been carried out once, then the AV receiver 100 returns to the processing of Step S4, and continues playback in the order indicated by the reservation list R. Here, even if a playback request is made again from the same smartphone, the request is not added to the reservation list R of the current phase, and playback is carried out according to the order indicated by the reservation list R.

Then, when a playback request is made for one track each from the smartphones 301 to 303 connected to the AV receiver 100 and it is determined that the playback of all the tracks for which playback requests were made has been completed, the AV receiver 100 allows the playback request of the preferential user to cut in (Step S61). In this example, the AV receiver 100 constantly tabulates the users' evaluations of each audio data. Then, the AV receiver 100 changes the playback order of the tracks included in the reservation list R, such that the track of the playback request from the smartphone that provided the audio data with the highest evaluation at that point in time is played back first after the track that is currently being played back. As a result, after the playback requests of all the users are completed, the playback request of the user of the smartphone that provided the audio data and that received a higher evaluation will be preferentially played back.

The tabulation result can be reset after the completion of processing of Step S61, and the evaluations made until the playback of audio data with respect to the playback requests of all the users is completed next can be tabulated (that is, tabulation is carried out for each phase). The tabulation result can be continued to be added to and subtracted from without resetting.

As described above, the AV receiver 100 can give preferential treatment to the user that made the playback request for the audio data that received a higher evaluation rather than the user of the smartphone that provided the audio data with a higher evaluation. The AV receiver 100 can give preferential treatment to both the user of the smartphone that provided the audio data with a higher evaluation and the user that made the playback request for the audio data that received a higher evaluation.

In the tabulation result, it is preferable to change the weighting according to the number of times of playback. For example, a user with a large number of playback requests will often receive a higher evaluation than a user smaller number of playback requests. Accordingly, the scores evaluated as "like" is divided by the number of playback requests, to decrease the weighting given to one evaluation. This prevents preferential treatment of only playback requests made by a specific user.

Second Embodiment

Figure 19:
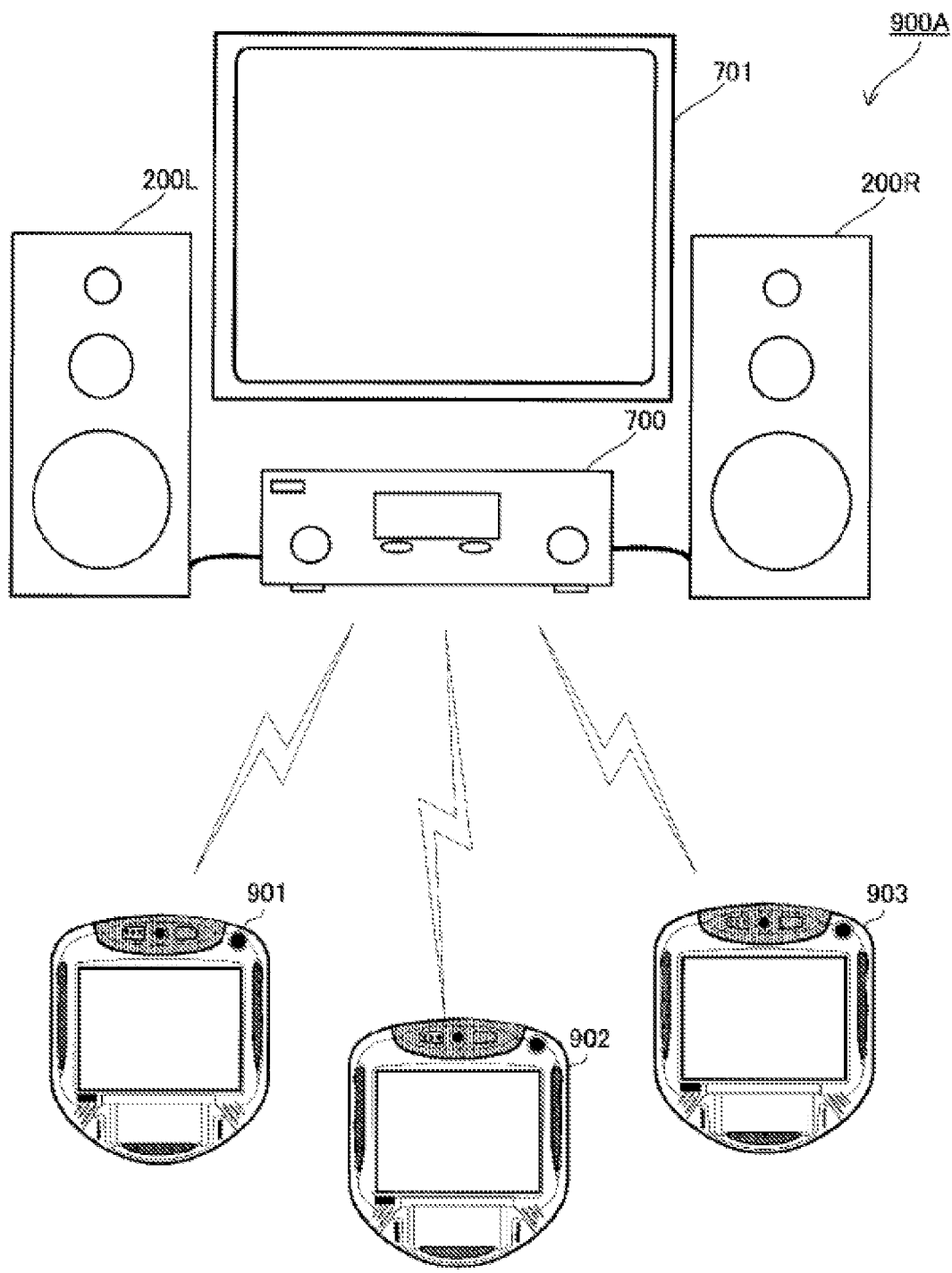
FIG. 19 is a diagram illustrating the configuration of a content playback system according to a second embodiment.

FIG. 19 is a diagram illustrating the configuration of the content playback system according to the second embodiment. The content playback system 900A according to the second embodiment comprises a karaoke device 700, a monitor 701, a speaker 200L, a speaker 200R, a remote controller 901, a remote controller 902, and a remote controller 903.

The karaoke device 700 is one example of a content playback device, and corresponds to the AV receiver 100 in the first embodiment. The remote controller 901, the remote controller 902, and the remote controller 903 are examples of user terminals, and correspond to the smartphone 301, the smartphone 302, and the smartphone 303 in the first embodiment. Data relating to the contents are karaoke music data in this example. The karaoke device 700 outputs sounds relating to karaoke music from the speaker 200L and the speaker 200R, and displays background image and lyrics image on the monitor 701.

The karaoke device 700 according to the second embodiment has the same configuration and the same functions as the AV receiver 100 in the first embodiment, and carries out the same operations as the AV receiver 100. The remote controllers 901 to 903 have the same configurations and the same functions as the respective smartphones 301 to 303 in the first embodiment and carry out the same operations as each of the smartphones 301 to 303. However, the second embodiment is different from the first embodiment in the following points.

That is, in the second embodiment, the shared list S shown in the first embodiment becomes a list of the karaoke music data, which includes all of the karaoke music data stored in the karaoke device 700. The karaoke music data are stored in a memory (not shown) of the karaoke device 700 and are not stored in the remote controller 901, the remote controller 902, and the remote controller 903. Therefore, it is not necessary for the karaoke device 700 to download karaoke music data from the remote controller 901, the remote controller 902, and the remote controller 903 when playing back the karaoke music data.

Furthermore, the remote controller 901, the remote controller 902, and the remote controller 903 are not terminals owned by the users, but are terminals installed in each of the karaoke rooms, and the like, of a karaoke store. Therefore, in the second embodiment, each user uses one of the remote controllers to log in (user authentication). When transmitting a playback request to the karaoke device 700, each remote controller also transmits the identification information of the user that made the playback request. The identification information of the user (ID, name, etc.) is registered together with the music name in the reservation list R. The evaluation of the karaoke music data becomes an evaluation of the user (that is, the singer) who made the playback request for the karaoke music data. In this case, the karaoke device 700 changes the playback order of the audio data included in the reservation list R based on the evaluation of the user who made the playback request.

In this manner, it is also possible to apply the content playback device according to an embodiment in karaoke. Each user is also able to evaluate and enjoy content (in the case of karaoke, the singer who requested said content) together with other users of karaoke. Furthermore, it is possible to realize a playback order that reflects the desires of the users.

A content playback device according to an embodiment comprises a receiver, an electronic controller and a communication device. The receiver receives a first playback request indicating a first content from a first user terminal, and a second playback request indicating a second content from a second user terminal. The electronic controller includes a registration unit that is configured to receive register the first and second contents indicated by the received first and second playback requests in a reservation list; a communication device that is configured to receive transmit the reservation list to the first user terminal. The electronic controller includes an evaluation reception unit that is configured to receive a first evaluation with respect to at least one of the first and second contents from the first user terminal. The electronic controller includes a determination unit that is configured to determine the playback order of the contents registered in the reservation list based on the first evaluation.

In this manner, the users of the first and second user terminals make playback requests for content that can be provided by the content playback device (for example, content stored in the content playback device), or for content that can be provided by the user terminals, and evaluate each content. For example, the determination unit determines the playback order such that content that received a higher evaluation is played back first. Therefore, the content playback device is able to realize a playback order that reflects the desires of the users. Furthermore, the content playback device is able to provide each user with a method of enjoyment in which contents are evaluated together with other users.

After the evaluation reception unit receives evaluations of all of the content registered in the reservation list and the determination unit determines the playback order, the playback unit can play back the content according to the order of the reservation list. This mode is suitable when the number of registrations in the reservation list is small and the number of users is large.

The playback unit can play back the content registered in the reservation list according to a predetermined condition. The evaluation reception unit can receive evaluations of each content in the reservation list while the playback unit is playing back the content. The playback unit can be configured to play back the next content according to the playback order, after the playback of the content that is currently being played back is completed. This mode is suitable when the number of registrations in the reservation list is large and the number of users is small.

The content playback device can comprise an identification unit that identifies the user who made the playback request. The evaluation reception unit can receive an evaluation regarding the content that the playback unit is currently playing back as an evaluation of the user who made the playback request corresponding to said content. The determination unit can determine the playback order based on the evaluation of the user.

That is, each user evaluates the content that is currently being played back. Then, the user who requested said content is evaluated. The evaluated user is given priority when making the next request, and the content that is requested by the user will be played back first.

What is claimed is:

1. A content playback device comprising:
   an electronic controller configured to create a shared list including a first content from a first user terminal a second content from a second user terminal, and a third content from a third user terminal, the first, second, and third contents being audio/visual contents;
   a communication device configured to transmit the shared list to the first, second, and third user terminals; and
   a receiver configured to receive a first playback request from the first user terminal that indicates audio/visual content selected from the shared list which includes the first, second, and third contents, a second playback request from the second user terminal that indicates audio/visual content selected from the shared list which includes the first, second, and third contents, and a third playback request from the third user terminal that indicates audio/visual content selected from the shared list which includes the first, second and third contents,
   the electronic controller including a registration unit that is configured to register the first, second, and third contents indicated by the first, second, and third playback requests in a reservation list that is a playlist to be played on a common speaker that is not part of the first, second, and third user terminals, the registration unit being configured to register the first, second, third contents in the reservation list based on an order in which the first, second, and third playback requests are received,
   the communication device being further configured to transmit the reservation list to the first user terminal,
   the electronic controller further including an evaluation reception unit that is configured to receive a first evaluation with respect to at least one of the first, second, and third contents from the first user terminal,
   the electronic controller further including a determination unit that is configured to change a playback order of the first, second, and third contents registered in the reservation list from an order based on the order in which the first, second, and third playback requests are received to an order based on the first evaluation, and the electronic controller further including a playback unit that is configured to randomly play back the first, second, and third contents included in the shared list, while the receiver is receiving the first, second, and third playback requests, the registration unit is registering the first, second, and third contents indicated by the first, second, and third playback requests in the reservation list, the communication device is transmitting the reservation list to the first user terminal, the evaluation reception unit is receiving the first evaluation, and the determination unit is changing the playback order to the order based on the first evaluation, the playback unit being further configured to play back the first, second, and third contents according to a changed playback order that has been changed, after the determination unit has completed changing of the playback order to the order based on the first evaluation.

2. The content playback device as recited in claim 1, wherein the communication device is further configured to transmit the reservation list to the second user terminal, the evaluation reception unit is further configured to receive a second evaluation with respect to at least one of the first, second, and third contents from the second user terminal, the determination unit is configured to change the playback order to an order based on the first and second evaluations, and after the evaluation reception unit receives the first evaluation and the second evaluation and the determination unit has completed changing of the playback order to the order based on the first and second evaluations, the playback unit is configured to play back the first, second, and third contents registered in the reservation list according to the changed playback order that has been changed based on the first and second evaluations.

3. The content playback device as recited in claim 1, wherein after the playback of one of the first, second, and third contents that is being played back when the determination unit completes the changing of the playback order to the order based on the first evaluation is completed, the playback unit is configured to play back the first, second, and third contents registered in the reservation list according to the changed playback order.

4. The content playback device as recited in claim 1, wherein the evaluation reception unit is further configured to receive an evaluation regarding a playback content, which is audio/video content that the playback unit is currently playing back, as an evaluation of a user using a user terminal who made a playback request indicating the playback content, and the determination unit is further configured to change the changed playback order based on the evaluation of the user.

5. The content playback device as recited in claim 1, wherein the evaluation reception unit is configured to receive the first evaluation via the communication device, and the playback unit is configured to receive audio/visual contents from the first, second, and third user terminals via the communication device and play back the received contents.

6. The content playback device as recited in claim 1, wherein the communication device is configured to transmit the changed playback order to outside of the content playback device.

7. The content playback device as recited in claim 1, wherein the electronic controller further includes an information reception unit that is configured to receive first information indicating the first content from the first user terminal that provided the first content, second information indicating the second content from the second user terminal that provided the second content, and third information indicating the third content from the third user terminal that provided the third content, and the electronic controller is configured to create the shared list in which the first, second, and third contents are registered based on the first, second, and third information.

8. A content playback method comprising:

creating a shared list including a first content from a first user terminal, a second content from a second user terminal, and a third content from a third user terminal, the first, second, and third contents being audio/visual contents;

transmitting the shared list to the first, second, and third user terminals;

receiving a first playback request from the first user terminal that indicates audio/visual content selected from the shared list which includes the first, second, and third contents;

receiving a second playback request from the second user terminal that indicates audio/visual content selected from the shared list which includes the first, second, and third contents;

receiving a third playback request from the third user terminal that indicates audio/visual content selected from the shared list which includes the first, second, and third contents;

registering the first, second, and third contents indicated by the first second, third playback requests in a reservation list in a content playback device, the reservation list being a playlist to be played on a common speaker that is not part of the first second, and third user terminals, the first, second, third contents being registered in the reservation list based on an order in which the first, second, and third playback requests are received;

transmitting the reservation list from the content playback device to the first user terminal;

receiving a first evaluation in the content playback device with respect to at least one of the first, second, and third contents from the first user terminal;

changing a playback order in the content playback device of the first second, and third contents registered in the reservation list from an order based on the order in which the first, second, and third playback requests are received to an order based on the first evaluation;

randomly playing back the first, second, and third contents included in the shared list during the receiving of the first playback request, the receiving of the second playback request, the receiving of the third playback request, the registering of the first second, and third contents indicated by the first, second, third playback requests in the reservation list, the transmitting of the reservation list, the receiving of the first evaluation, and the changing of the playback order to the order based on the first evaluation; and playing back the first, second, and third contents according to a changed playback order that has been changed, after the changing of the playback order to the order based on the first evaluation has been completed.

9. The content playback method as recited in claim 8, further comprising transmitting the reservation list to the second user terminal, receiving a second evaluation with respect to at least one of the first, second, third contents from the second user terminal, wherein the playback order is changed to an order based on the first and second evaluations, and after receiving the first and second evaluations and completing changing of the playback order to the order based on the first and second evaluations, the first, second, and third contents registered in the reservation list are played back according to the changed playback order that has been changed based on the first and second evaluations.

10. The content playback method as recited in claim 8, wherein after the playback of one of the registered first, second, and third contents that is being played back when the changing of the playback order to the order based on the first evaluation is completed is completed, the first, second, and third contents registered in the reservation list are played back according to the changed playback order.

11. The content playback method as recited in claim 8, further comprising receiving an evaluation regarding a playback content, which is audio/video content that is currently played back, as an evaluation of a user using a user terminal who made a playback request indicating the playback content, and changing the changed playback order based on the evaluation of the user.

12. The content playback method as recited in claim 8, wherein the first evaluation is received via a communication device, the first, second, and third contents from the first, second, third user terminals via the communication device, and the first, second, and third contents that were received are played back.

13. The content playback device as recited in claim 1, wherein the receiver is configured to receive a first public list indicating the first content from the first user terminal, a second public list indicating the second content from the second user terminal, and a third public list indicating the third content from the third user terminal, the first, second, and third public lists being user selected audio/visual content to be shared, and the electronic controller is configured to merge the first, second, and third public lists received from the first, second, and third user terminals to create the shared list.

14. The content playback device as recited in claim 1, wherein the determination unit is configured to change the changed playback order in the reservation list such that audio/visual content which is indicated by a playback request from one of the first, second, and third user terminals that provides audio/visual content with a highest evaluation among audio/visual contents that an other of the first, second, and third user terminals provide is played back first.

15. The content playback device as recited in claim 1, wherein the electronic controller is configured to increase an acceptable number of playback requests from one of the first, second, and third user terminals that provides audio/visual content with a highest evaluation among audio/visual contents that the first, second, and third user terminals provide, in comparison of others of the first, second, and third user terminals.

* * * * *